(12) United States Patent
Altman et al.

(10) Patent No.: US 8,627,317 B2
(45) Date of Patent: Jan. 7, 2014

(54) AUTOMATIC IDENTIFICATION OF BOTTLENECKS USING RULE-BASED EXPERT KNOWLEDGE

(75) Inventors: Erik R. Altman, Danbury, CT (US); Matthew R. Arnold, Ridgefield Park, NJ (US); Nicholas M. Mitchell, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 577 days.

(21) Appl. No.: 12/873,920

(22) Filed: Sep. 1, 2010

(65) Prior Publication Data

US 2012/0054472 A1 Mar. 1, 2012

Related U.S. Application Data

(60) Provisional application No. 61/317,512, filed on Mar. 25, 2010.

(51) Int. Cl.
*G06F 9/455* (2006.01)
*G06F 9/46* (2006.01)

(52) U.S. Cl.
USPC .......................................................... 718/100

(58) Field of Classification Search
None
See application file for complete search history.

(56) References Cited

U.S. PATENT DOCUMENTS 7,739,675 B2   6/2010  Klein

OTHER PUBLICATIONS

Power; Design and use of a program execution analyzer; 1983; IBM Systems Journal, vol. 22, No. 3, pp. 271-294.*

Aguilera et al., Performance Debugging for Distributed Systems of Black Boxes, Symposium on Operating System Principles, ACM, 2003.
Alexander et al., A unifying approach to performance analysis in the Java environment, IBM Systems Journal, 2000, vol. 39, No. 1.
Ammons et al., Finding and Removing Performance Bottlenecks in Large Systems, The European Conference on Object-Oriented Programming, Springer, 2004.
Darmawan et al., IBM Tivoli Composite Application Manager Family: Installation, Configuration, and Basic Usage, Jan. 2008.
De Pauw et al., Visualizing the Execution of Java Programs, Software Visualization, State-of-the-art Survey, vol. 2269 of Lecture Notes in Computer Science, Springer-Verlag, 2002.
Hall, Cpprofj: Aspect-Capable Call Path Profiling of Multi-Threaded Java Applications, Automated Software Engineering, IEEE Computer Society Press, 2002, pp. 107-116.
Hollingsworth, Finding Bottlenecks in Large-scale Parallel Programs, PhD Thesis, University of Wisconsin, Aug. 1994.
Host et al., Debugging Method Names, The European Conference on Object-Oriented Programming, 2009, abstract.
Mitchell et al., Modeling Runtime Behavior in Framework-based Applications, The European Conference on Object-Oriented Programming, 2006.
Srinivas et al., Summarizing Application Performance From a Components Perspective, Foundations of Software Engineering, 2005, pp. 136-145, vol. 30, No. 5, abstract.

(Continued)

*Primary Examiner* — Corey S Faherty
(74) *Attorney, Agent, or Firm* — Scully, Scott, Murphy & Presser, P.C.; Louis J. Percello, Esq.

(57) ABSTRACT

Execution states of tasks are inferred from collection of information associated with runtime execution of a computer system. Collection of information may include infrequent samples of executing tasks, the samples which may provide inaccurate executing states. One or more tasks may be aggregated by one or more execution states for determining execution time, idle time, or system policy violations, or combinations thereof.

25 Claims, 20 Drawing Sheets

(56) References Cited

OTHER PUBLICATIONS

Borland Software Corporation, OptimizeIt Enterprise Suite, 2005, http://info.borland.com/devsupport/optimizeit/.

Compuware, Compuware Vantage Analyzer, http://www.compuware.com/solutions/e2e_brochures_factsheets.asp.

Eclipse, Eclipse Test & Performance Tools Platform Project, http://www.eclipse.org/tptp.

HP, HP Diagnostics for J2EE, https://h10078.www1.hp.com/cda/hpms/display/main/hpms_content.jsp?zn=bto&cp=1-11-15-25%5E761_4000_100_.

IBM, Compuware Vantage Analyzer, http://alphaworks.ibm.com/tech/dcva4j/download.

IBM, IBM OMEGAMOM XE for WebSphere, http://www-01.ibm.com/software/tivoli/products/omegamon-xe-was.

IBM, Thread and Monitor Dump Analyzer for Java, http://www.alphaworks.ibm.com/tech/jca.

IBM, Tivoli Monitoring for Transaction Performace, http://www-01.ibm.com/software/tivoli/products/monitor-transaction.

Sun Microsystems, HPROF JVM Profiler, http://java.sun.com/developer/technicalArticles/Programming/HPROF.html.

Yourkit LLC, Yourkit Profiler, http://www.yourkit.com.

Xu et al., Go With the Flow: Profiling Copies to Find Runtime Bloat, PLDI 2009: Proceedings of the 2009 ACM SIGPLAN Conference on Programming Language Design and implementation, 2009, pp. 419-430.

Xu et al., Detecting Large-Scale System Problems by Mining Console Logs, Proceedings of the 26th International Conference on Machine Learning, Haifa, Israel, 2010.

Yuan et al., Sherlog: Error Diagnosis by Connecting Clues from Run-Time Logs, ASPLOS'10, Mar. 13-17, 2010, Pittsburgh, Pennsylvania, USA.

Zhao et al., Allocation Wall: A Limiting Factor of Java Applications on Emerging Multi-Core Platforms, OOPSLA '09 Proceeding of the 24th ACM SIGPLAN conference on Object oriented programming systems languages and applications.

\* cited by examiner

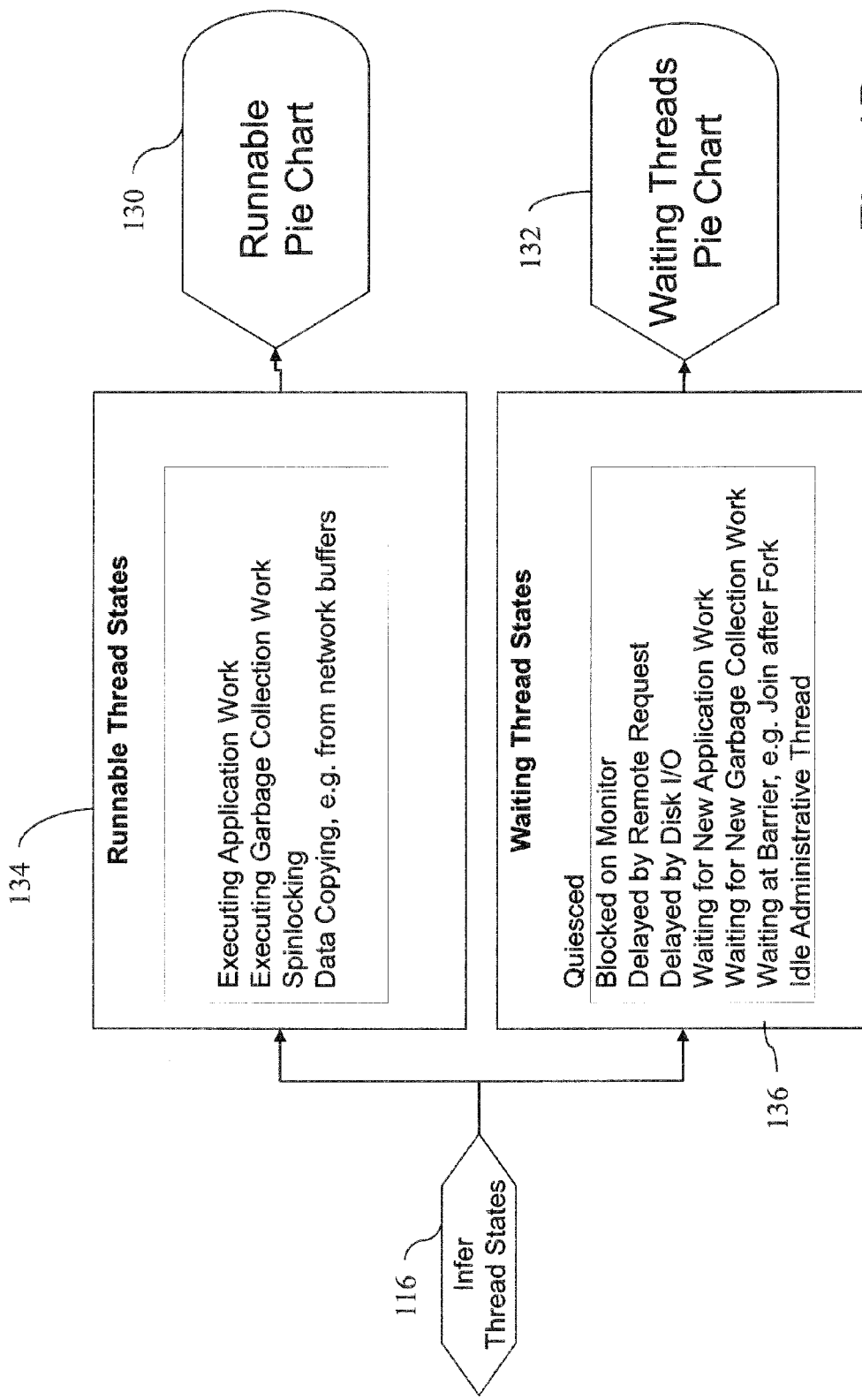

FROM FIG. 3A

| | | | |
|---|---|---|---|
| 41.1 | BLOCKED ON MONITOR | LOGGING INFRASTRUCTURE | com/filenet/engine/persist/VersionablePersister.preExecuteChange() line 232 |
| | | | com/filenet/engine/persist/IndependentPersister.executeChangeWork() line 388 |
| | | | com/filenet/engine/persist/IndependentPersister.executeChange() line 234 |
| | | | com/filenet/engine/persist/SubscribablePersister.executeChange() line 155 |
| | | | com/filenet/engine/jca/impl/RequestBrokerImpl.executeChanges() line 1258 |
| | | | [more...] |
| | | | org/apache/log4j/Hierarchy.getLogger() line 258 |
| | | | org/apache/log4j/Hierarchy.getLogger() line 233 |
| | | | org/apache/log4j/LogManager.getLogger() line 179 |
| | | | org/apache/log4j/Logger.getLogger() line 85 |
| | | | com/filenet/api/impl/util/BaseLogger.getLogger() line 558 |
| | | | com/filenet/api/impl/util/BaseLogger.traceDetail() line 851 |
| | | | com/filenet/engine/content/ContentOperations.finalizePutContent() line 669 |
| | | | com/filenet/engine/content/PutContentHandler.finalizePutContent() line 633 |
| | | | com/filenet/engine/content/ContentStorage.getContentElementInfo() line 738 |
| | | | com/filenet/engine/persist/WithContentPersister.encodeElement() line 845 |
| | | | com/filenet/engine/persist/WithContentPersister.preprocessProps() line 882 |
| | | | com/filenet/engine/persist/WithContentPersister.preExecuteChange() line 453 |
| | | | com/filenet/engine/persist/VersionablePersister.preExecuteChange() line 232 |
| | | | com/filenet/engine/persist/IndependentPersister.executeChangeWork() line 388 |
| | | | com/filenet/engine/persist/IndependentPersister.executeChange() line 234 |
| | | | [more...] |

FIG. 3B

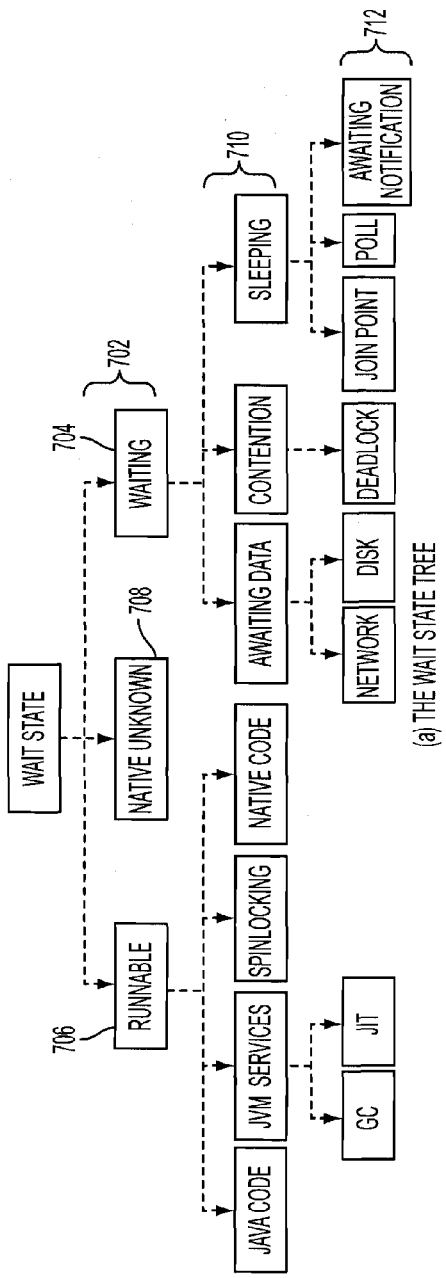
FIG. 7A (a) THE WAIT STATE TREE
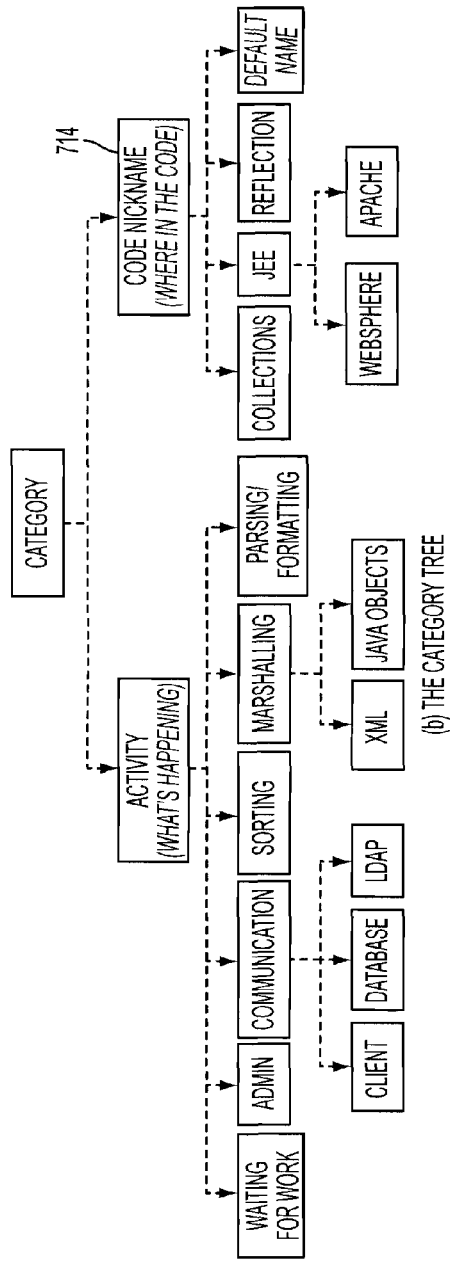
FIG. 7B (b) THE CATEGORY TREE

| 3 | HTTP_Worker | 0x... | Thread.run() | 0x... | 0x... | 0x... | 0x... | 0x... |
|---|---|---|---|---|---|---|---|---|
| SAMPLE INDEX | THREAD NAME | THREAD ID | CALL STACK | OWNED MONITORS | | | WAITING | BLOCKED |

FIG. 9

CALL STACK CLUSTERS

| | | |
|---|---|---|
| CALL STACK | C.D() | E.F() |
| | A.B() | A.B() |
| | Thread.run() | Thread.run() |
| COUNT | 3592 | 293 |
| | c1 | c2 |

THREADS 1002

| | | |
|---|---|---|
| t1 | HTTP_Worker | FALSE |
| t2 | Alarm Thread | FALSE |
| t3 | Finalizer Thread | TRUE |
| | MONITOR NAME | NATIVE? |

MONITORS

| | | | |
|---|---|---|---|
| m1 | Heap Lock | TRUE | FALSE |
| m2 | Hashtable | FALSE | FALSE |
| m3 | Thread Public flags | FALSE | TRUE |
| | MONITOR NAME | NATIVE? | QUIESCE? |

1002
THREAD

| | | | | | |
|---|---|---|---|---|---|
| c1 | t2 | t3 | t2 | t2 | t2 |
| c2 | t1 | | t1 | | t1 |

WAITING

| | | | | | |
|---|---|---|---|---|---|
| c1 | | | m3 | | |
| c2 | m1 | m1 | m1 | m1 | m1 |

BLOCKED

| | | | | | |
|---|---|---|---|---|---|
| c1 | m2 | | | | m2 |
| c2 | | | | | |

OWNED BY

| | | | | | |
|---|---|---|---|---|---|
| m1 | | | | | |
| m2 | c2 | | | | c2 |
| m3 | | | c1 | | |
| | 1 | 2 | 3 | 4 | 5 |
| | | | SAMPLE INDEX | | |

FIG. 10

```
com/mysql/jdbc/ConnectionImpl.commit    ⇒  DATABASE COMMIT
         .../XATransactionWrapper.rollback  ⇒  DATABASE ROLLBACK
... /SQLServerStatement.doExecuteStatement  ⇒  DATABASE QUERY
        ... /WSJdbcStatement.execu Batch    ⇒  DATABASE BATCH
             ... /OracleResultSetImpl.next  ⇒  DATABASE CURSOR
```

FIG. 11

```
       java/net/SocketInputStream.socketRead0   ⇒  NETWORK
       com/xxx/as400/NativeMethods.socketRead    ⇒  NETWORK
           org/apache/.../OSNetworkSystem.write  ⇒  NETWORK
           sun/nio/ch/SocketChannelImpl.write0   ⇒  NETWORK
                         java/lang/Object.wait   ⇒  % CONDVAR
       java/util/concurrent/locks/ReentrantLock ⇒  % CONDVAR
  (A) DECLARATIVE RULES BASED ON ONE LEAF INVOCATION                 ⟵ 1202
       %Condvar & ObjectInputStream.readObject  ⇒  NETWORK
  (B) A DECLARATIVE RULE BASED ON SEVERAL FRAMES IN A STACK
```

FIG. 12

FROM FIG. 19A

⊙ Category Breakdown of the most important Thread States

Click a category to view the thread stock samples that contribute to it

Filesystem Metadata Operations ▐▏▐▏▐▏▐▏▐▏▐▏▐▏▐▏ 36 threads
Getting Data from Database ░░░░░ 9 threads
Client Communication ▒▒▒ 4 threads
miscellaneous Code ▦▦ 3 threads
miscellaneous xxx.RMI Code ▤▤ 1.4 threads
Client Communication(RMI) ▨ 1 threads ⊙ Stack Viewer: "Filesystem Metadata Operations" category: Delayed by Disk I/O Stack depth 3 ▽

| Num Threads | Category | Thread stack |
|---|---|---|
| 22.1 | Filesystem Metadata Operations | java/io/UnixFileSystem.createFileExclusively() native method<br>java/io/File.createNewFile() line 879<br>com/filene/engine/content/FileContentArea/startPutContent() line 843<br>[more...] |
| 8 | Filesystem Metadata Operations | java/io/UnixFileSystem.rename0() native method<br>java/io/UnixFileSystem.rename() line 294<br>java/io/File.renameTo() line 1230<br>[more...] |
| 6 | Filesystem Metadata Operations | java/io/FileOutputStream.open() native method<br>java/io/FileOutputStream.<init>() line 205<br>com/filene/engine/content/FileContentArea/startPutContent() line 879<br>[more...] |

FIG. 19B

AUTOMATIC IDENTIFICATION OF BOTTLENECKS USING RULE-BASED EXPERT KNOWLEDGE

CROSS-REFERENCE TO RELATED APPLICATIONS

The present application claims the benefit of U.S. Provisional Patent Application No. 61/317,512, filed on Mar. 25, 2010. That provisional application is incorporated herein by reference in its entirety.

FIELD

The present application generally relates to computer systems and more particularly to identifying performance bottlenecks, idle time fault/policy violations and other process states in computer systems.

BACKGROUND

Identifying performance problems, in particular scalability bottlenecks, is difficult and often left to a small number of performance experts. To know whether a system runs smoothly requires a careful collation of disparate observations. Typically, a performance expert knows the signifiers of certain classes of problems: e.g., errors in log files, or excessive time spent in garbage collection or waiting on data sources. After collecting as much data as is feasible to dredge from the system, the expert proceeds with the tedious task of altering and combining, and of applying rules, to interpret what the raw data implies about the quality of performance that the system currently achieves. Performance is often suboptimal due to a superposition of unrelated problems. The expert casts a wide net of data collection, in order to identify these problems so that they can be prioritized. Once the largest problem has been fixed, the process iterates.

Few existing tools focus on identifying contended resources. However, those tools are not useful for identifying threads that are idle and unable to make progress. Rather, they generally focus on a particular class of problems, such as finding contended locks. That is, these tools focus on one point in the space of scalability analysis. Point tools can be effective once the class of a bottleneck is known. However, determining the class of a bottleneck, in itself, is a challenging step.

BRIEF SUMMARY

A method and system for automatically identifying computer system performance bottlenecks and/or excess idle time may be provided. The method, in one aspect, may include collecting information associated with runtime execution of a computer system and inferring one or more execution states of one or more tasks within the system. The method may also include aggregating said one or more tasks by said one or more execution states for determining execution time, idle time, or system policy violations, or combinations thereof.

A system for automatically identifying computer system performance bottlenecks using rule-based expert knowledge, in one aspect, may include a module operable to collect information associated with runtime execution of a computer system and infer one or more execution states of one or more tasks within the system. In another aspect, the system may also include an application interface operable to provide the summarized execution activity to a user. Yet in another aspect, the system may further include a user interface operable to provide the summarized execution activity to the user. The collected information may include infrequent samples of executing tasks.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

BRIEF DESCRIPTION OF THE SEVERAL VIEWS OF THE DRAWINGS

FIGS. 1A, 1B, 1C illustrate a method in one embodiment of automatically identifying bottlenecks in one embodiment of the present disclosure.

FIG. 7A illustrates a wait state tree in one embodiment of the present disclosure.

FIG. 7B illustrates a category tree in one embodiment of the present disclosure.

FIG. 9 illustrates a sample raw input from stack sampling in one embodiment of the present disclosure.

FIG. 10 illustrates a data model (structure) after clustering in one embodiment of the present disclosure.

FIG. 11 illustrates a sample set of rules for categorizing in one embodiment of the present disclosure.

FIG. 12 illustrates a sample set of rules for inferring wait states in one embodiment of the present disclosure.

DETAILED DESCRIPTION

Figure 1A:
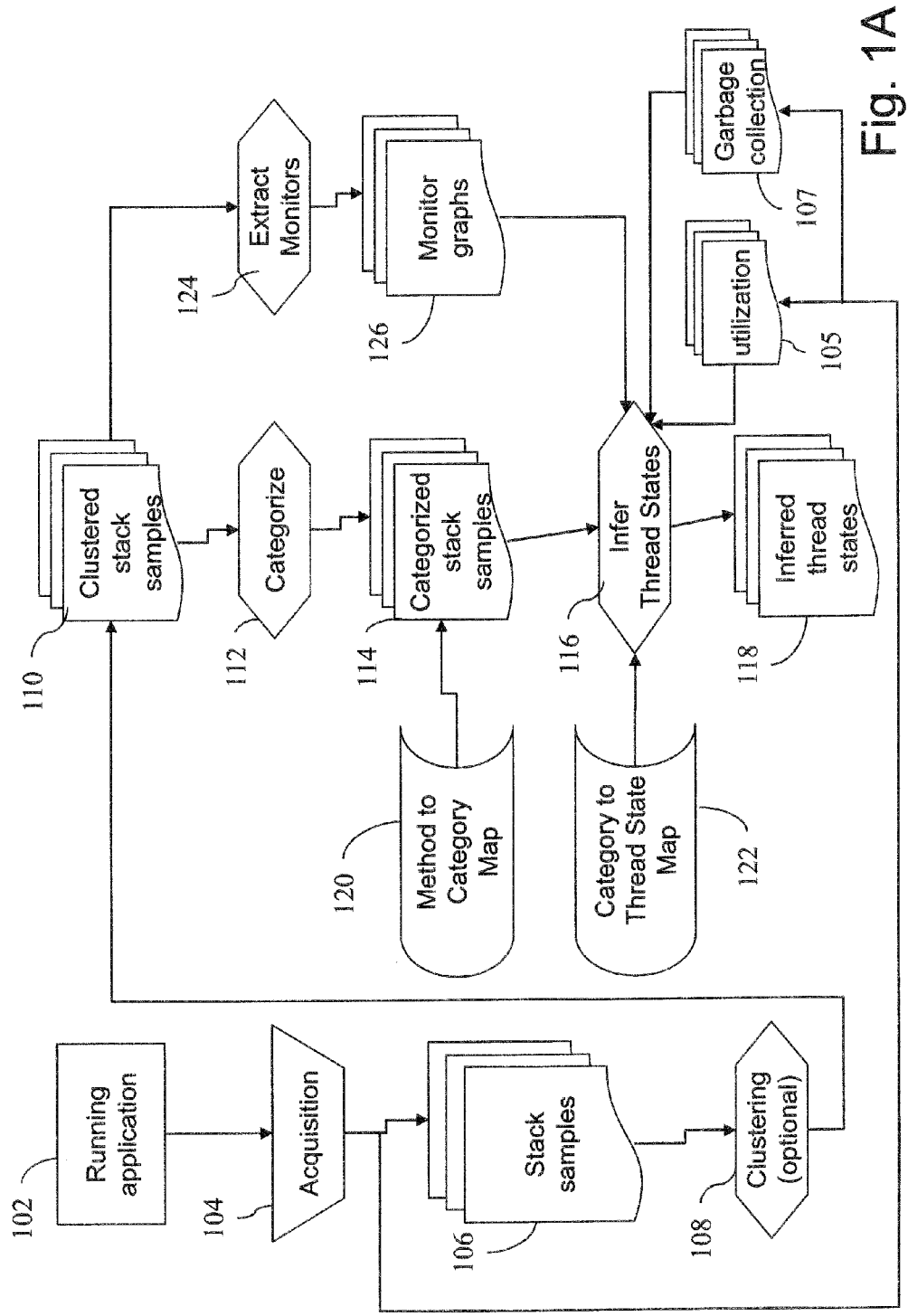
Figure 1C:
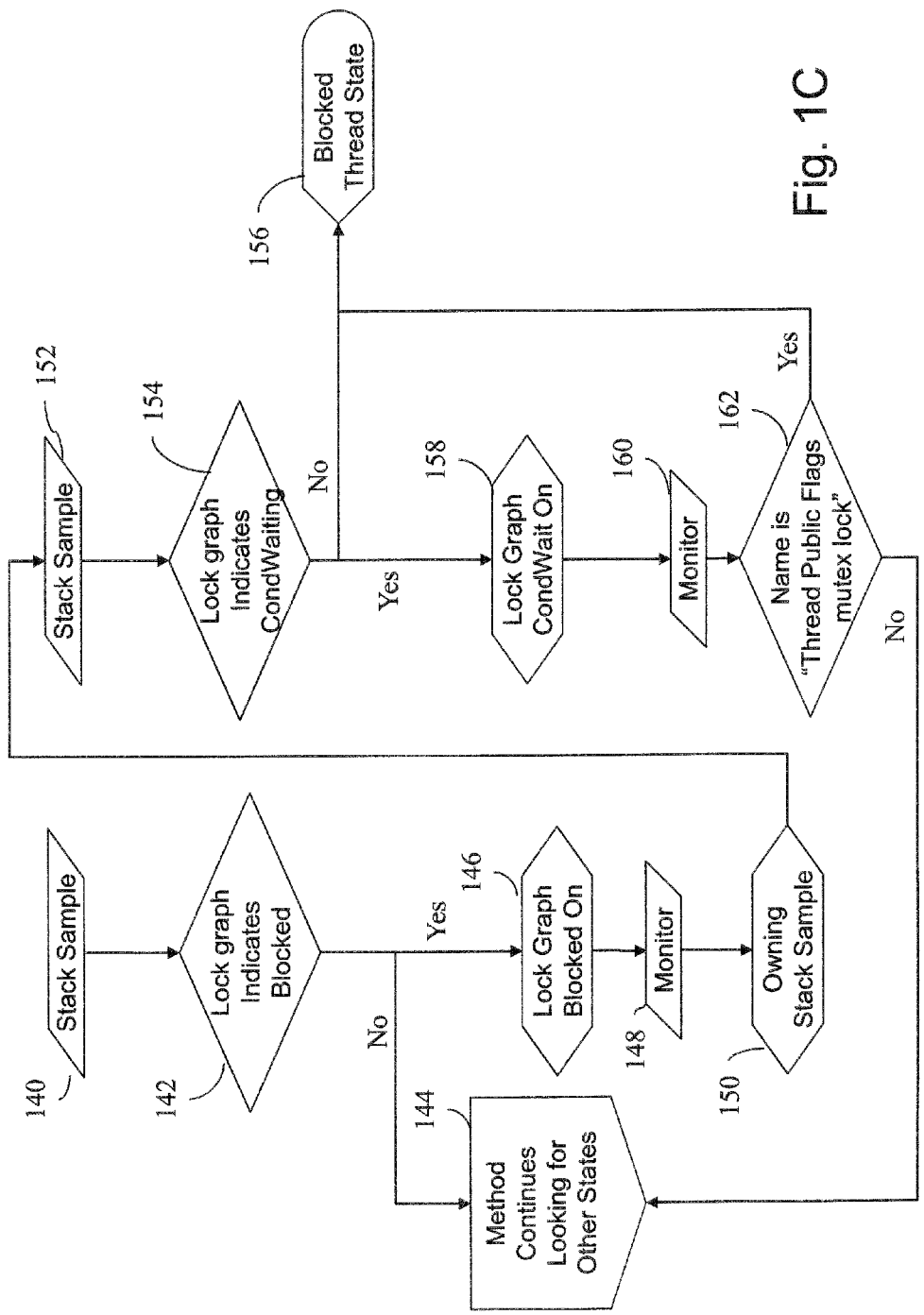

FIGS. 1A, 1B, 1C illustrate a method in one embodiment of automatically identifying bottlenecks and/or excess idle times of processes and/or threads. Referring to FIG. 1A, an application is running at 102. There may be a plurality of applications running in the computer system, for instance, to perform one or more desired functions. The system and method of the present disclosure need not specifically run or start an application. Rather, the system and method of the present disclosure may work from data collected about the already running application on one or more computer systems. At 104, information about the runtime execution of the computer system and running application is collected. The information about the runtime execution or the collected data may include but is not limited to, javacores or like system dumps, full trace of execution, vmstat information that includes virtual machine status information that shows machine utilization, and ps information that shows process utilization or status. The system and method of the present disclosure need not disrupt the running applications in order to obtain the runtime execution information or data. Further, they may be information that is collected infrequently.

The information collected at 104 includes stack samples at 106. The stack samples may include one or more process stack or thread stack or combinations thereof. A thread stack for example stores method calls, data, and operands which are pushed and popped into and out of the stack as the thread executes. A process stack stores similar elements.

Optionally, the stack samples may be clustered at 108 resulting in one or more clustered stack samples at 110. For example, raw data in the stack samples may indicate a thread executing the same instruction flow multiple times. Thus, duplicate or redundant call flow may be clustered into a single execution flow, for instance, for better manageability of data in the stack samples.

At 112, the stack samples, whether clustered (110) or raw (106), are categorized, producing one or more categorized stack samples at 114. In one embodiment of the present disclosure, in order to categorize the stack samples, expert knowledge that includes rules for labeling a specific method found in the stack samples 120 and/or rules that determine whether or not a thread is running may be used and executed.

That is, Method to Category Map at 120, for example, may include set of rules to determine the category label for each stack frame. The rules may be defined based on expert knowledge of labeling various methods into a category. Details of this step are described further below with reference to FIG. 7B; a sample set of rules are shown in FIG. 11. Category to Thread State Map at 122, for example, may include a set of rules for inferring wait states. Details of this step are described further below with reference to FIG. 7A; a sample set of rules are shown in FIG. 12.

At 124, monitors are extracted. The extract monitors step at 124 produces one or more monitor graphs 126. Briefly, monitors are programming objects that achieve synchronization in concurrent programming. Monitors are implemented such that any of its methods are executed at most by one thread at a point in time, i.e., in mutual exclusion. Further, monitors also provide a mechanism for threads to temporarily give up exclusive access, in order to wait for some condition to be met, before regaining exclusive access and resuming their task. Monitors also have a mechanism for signaling other threads that such conditions have been met. Monitor graphs 126 show what threads are waiting on a critical section.

At 116, thread states are inferred using monitor graphs 126, stack samples 114, and maps (expert knowledge including e.g., various rules) 120, 122, producing the inferred thread states 118. Further, information associated with the utilization of system resources 105 (e.g., disk usage/activity, network usage, and/or others) and garbage collection information 107 may be also used to infer thread states. The inferred thread states 118 provide information such as what a method on a stack is doing.

FIG. 1B illustrates the details of inferred thread states, for example, the aggregation of inferred states. For instance, inferred states may be aggregated into runnable thread states 134 and waiting thread states 136. Examples of states aggregated into runnable thread states 134 may include but not limited to, executing application work, executing garbage collection work, spinlocking, data copy (e.g., from network buffers). Such states may be displayed or presented as runnable pie chart graphics 130. Examples of waiting thread states 136 may include but not limited to block on monitor, delayed by remote request, delayed by disk I/O (input/output), waiting for new application work, waiting for new garbage collection work, waiting at barrier (e.g., join after fork), and/or idle administrative thread. Such states also may be displayed or presented as waiting threads pie chart graphics 130. Other types of graphic and non-graphic display or presentations may be provided for describing or presenting the inferred states.

FIG. 1C illustrates detailed control flow for thread state inference, for example, inferring of blocked on monitor state for javacores. Stack samples at 140 are analyzed to extract monitors and generate monitor graph (e.g., as explained with reference to FIG. 1 at 126). At 142, using the monitor graph, it may be determined whether a thread is blocked, i.e., waiting for a critical section. In the present disclosure, monitor graph is also referred to as lock graph. At 144, if the thread is not blocked on monitor, the control (or logic of the method of the present disclosure) searches to infer other states. At 146, it is determined that the thread is blocked on a monitor 148. At 150, the owner of the monitor 148 is determined. At 152, a stack cluster of the monitor's owner is identified.

At 154, it is determined whether the owning stack sample is waiting to be notified on a condition variable. In the present disclosure, as in the standard terminology of Java™, a monitor is either a condition variable or a lock. If no, at 156, the thread is determined as being blocked, waiting on a monitor. Otherwise, at 158 the lock graph is inspected to determine the monitor 160 that the owning stack sample is waiting on. At 162, the monitor's name is extracted and compared to the string, "Thread public flags mutex". If the name of the monitor equals that string, then, at 156, the thread is determined as being blocked, waiting on a monitor. Otherwise, at 144, the control (or logic of the method of the present disclosure) searches to infer other states.

Figure 2:
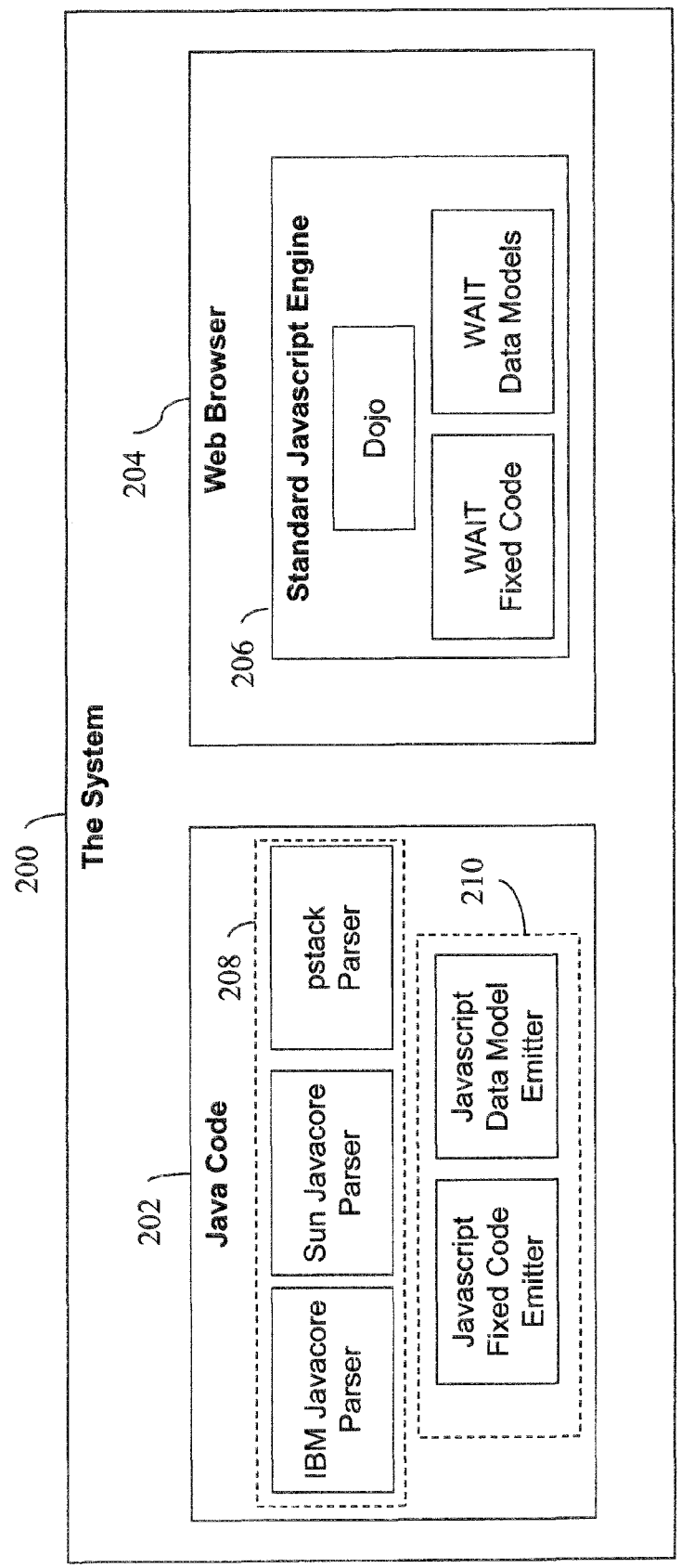
FIG. 2 is an architectural diagram illustrating functional components for a system that performs automatically identifying bottlenecks in one embodiment of the present disclosure.

FIG. 2 is an architectural diagram illustrating functional components for a system that performs automatically identifying bottlenecks, idle time, fault/policy violations and other states of one or more processes in one embodiment of the present disclosure. As an example, Java™ code or other computer code 202 may include parsing functionalities 208 that, for example, javacores and native system dump data (pstack). The computer code 202 may also include one or more scripts (e.g., Javascript™ fixed code emitter and Javascript™ data model emitter) 210 or the like that emit expert knowledge rules (also referred to as a fixed code) and parsed stack sample data (also referred to as a data model). An example of parsed stack data in a form of a data model or structure is shown in FIG. 10.

An engine 206 such as a standard Javascript™ engine or a processing module may apply the expert knowledge rules on the stack sample data and infer various states of the threads associated with the stack sample data. A Javascript™ engine may run by a Web Browser 204, which may provide graphical user interface functionalities to the user.

Figure 3A:
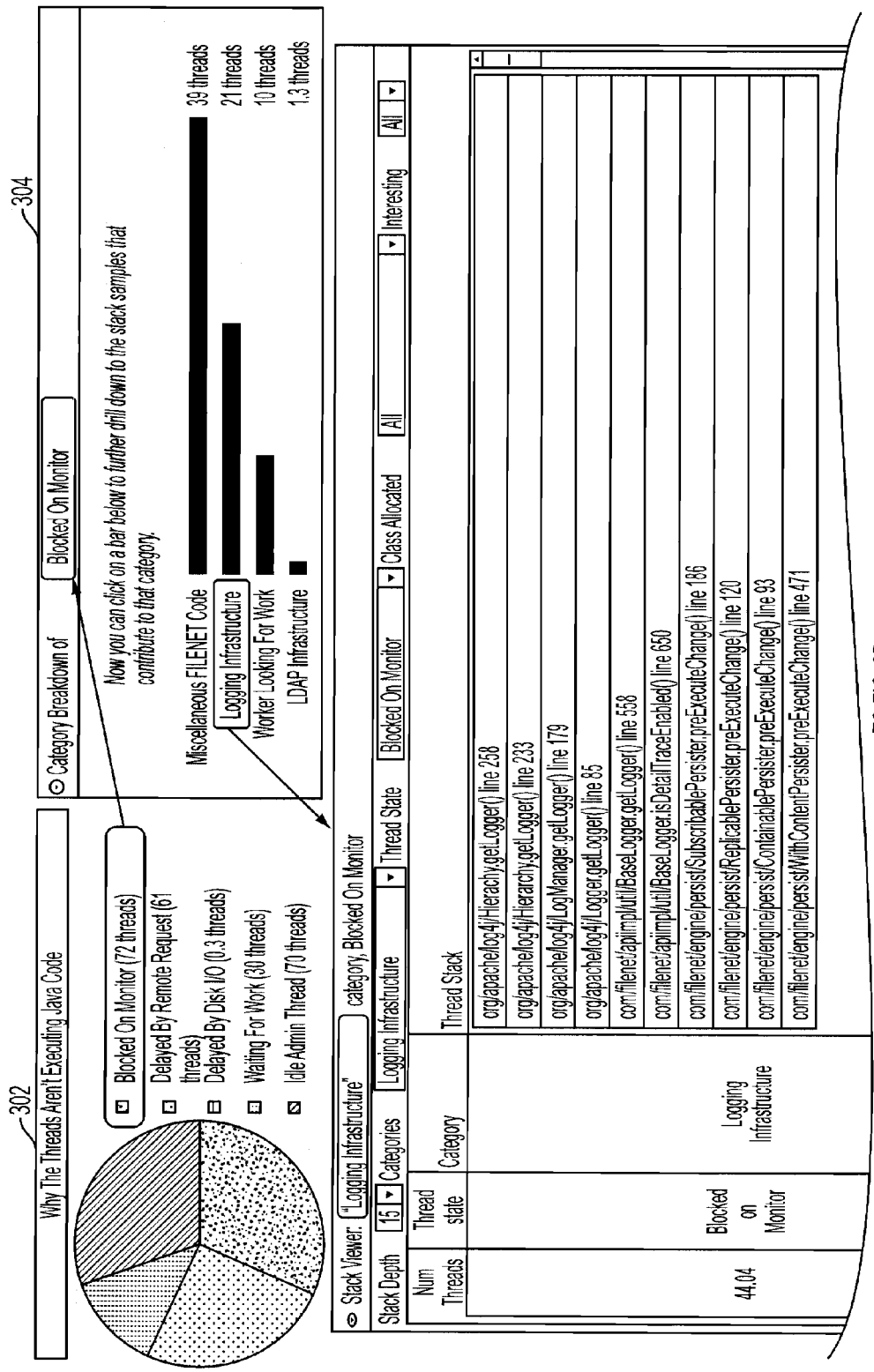
FIG. 3 illustrates information that may be provided to the user in the form of a graphical user interface in one embodiment of the present disclosure.

FIG. 3 illustrates information that may be provided to the user in the form of a graphical user interface. Graphics such as a pie chart (302) or others may show the state of the threads and/or processes, for example, and why the threads are not running or blocked. The non-running threads may be grouped into different categories of reasons. The categories may include, for example, as shown at 302, blocked monitor, delayed by remote request, delayed by disk input/output (I/O), waiting for work, idle admin thread, and others. A portion of the graphics, for instance, a pie slice may be further drilled down to present more details shown at 304. For example, the details may show what program activity contributes to the pie slice; display raw stacks, and/or provide other information.

More detail explanation of the above described method and component follows.

The methodology of the present disclosure in one embodiment performs idle time analysis, for instance, and focusing on explaining idle time. Specifically, the methodology of the present disclosure in one embodiment tries to determine the root cause that leads to under-utilized processors. Additionally, the present disclosure in one embodiment also may provide for presenting information in a way that is easily consumable, and operate under restrictions typical of production deployment scenarios. In the present disclosure in one embodiment, a hierarchical abstraction of execution state presents a novel abstraction of concrete execution states, which provides a hierarchy of abstract states corresponding to different sources of idle time. Unlike traditional profiling tools, the present disclosure may present a high-level characterization of application behavior computed by an expert system. The expert system may be codified by a set of declarative rules, which a practitioner may easily customize. A methodology is presented in the present disclosure in one embodiment that infers behavior based on ubiquitous sampling mechanisms. The methodology may analyze performance effectively based on lightweight, non-intrusive sampling information available by default, for example, from standard Java™ Virtual Machines (JVMs) and operating systems. The end user need not restart, recompile, or otherwise modify the running application, for example, more readily allowing for wide-scale adoption of the methodology.

Figure 4:
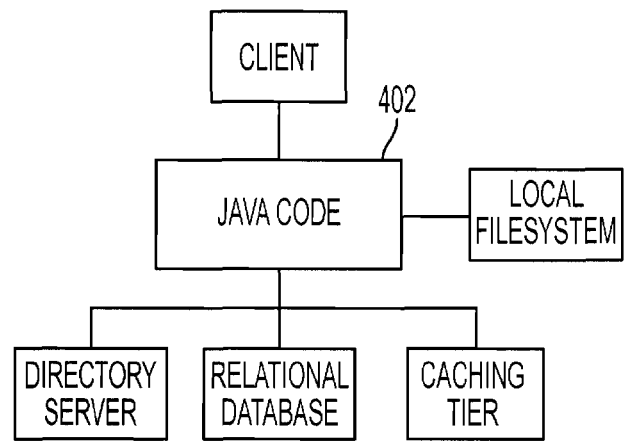
FIG. 4 illustrates a structure of a JEE application.

In the present disclosure, the method and system (also referred collectively as a methodology) are explained with reference to an example case of performance diagnosis for a Java™ Enterprise Edition (JEE) application. However, it should be understood that the methodology of the present disclosure is not limited only to that application. FIG. 4 illustrates a structure of a JEE application. A JEE application server, running Java™ code, sits in the middle of several communicating tiers of machines (e.g., like a hub) 402; these tiers include clients, relational databases, and directory and caching services.

To understand performance of this application, a methodology of the present disclosure in embodiment may use a Hub Sampling approach. With the approach, it is demonstrated how the analysis of only the Java™ tier can provide insight into bottlenecks in the system as a whole.

Hub Sampling

To identify primary bottlenecks in Java™-hub applications, the methodology of the present disclosure in one embodiment collects samples of processor utilization and samples of the state of the Java™ threads. Production environments impose severe constraints on the types of monitoring and tools deemed acceptable. For example, code instrumentation is often a non-starter: many organizations will not rebuild an application with instrumentation, deploy a non-standard runtime system, or enable any non-trivial monitoring agent. Many organizations will not tolerate any observable performance overhead, except perhaps under limited and carefully controlled guidance. Additionally, many organizations will not tolerate large trace files, and will not allow any interactive access to the monitored systems.

To work within these constraints, the methodology of the present disclosure in one embodiment may rely on ubiquitous monitoring technology, without requiring instrumentation or nontrivial agents. The methodology of the present disclosure in one embodiment also may make do with a relatively small corpus sample-based monitor data, collected during a small window and processed offline.

The methodology of the present disclosure in one embodiment may use built-in sampling mechanisms most production JVMs provide, whereby the JVM will respond to signals and dump relatively small core ("javacore") files with data representing the current JVM state.

Figure 5:
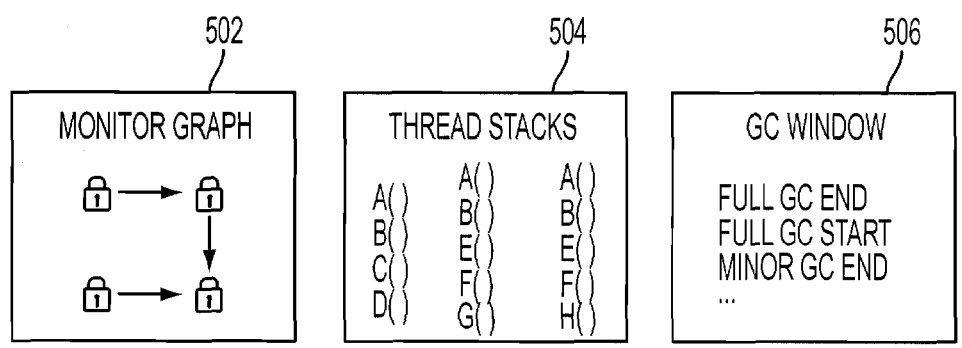
FIG. 5 illustrates data sampled from a running JVM used for inferring the existence and nature of performance bottlenecks in one embodiment of the present disclosure.

FIG. 5 illustrates the data that is available from JVMs, without requiring any changes to an application's deployed configuration: the monitor graph 502, which specifies the ownership and queuing relationships between threads and monitors; thread stack samples 504; the conventional run state of each thread (i.e., Runnable, CondWait, Blocked, Parked); and a window of garbage collection events 506. Furthermore, the methodology of the present disclosure in one embodiment uses infrequent samples, for example, acquired once or twice per minute, and provides results that yield surprising insight into the primary system bottlenecks.

Idle Time Analysis

Even with relatively infrequent samples, javacore dumps of JEE server applications can carry a tremendous volume of information. Consider simple stack samples: often stacks in a JEE application extend to several hundred stack frames spanning dozens of logical components from different vendors. Understanding the relevant information from even a single such stack requires a lot of work. Now consider that an application will typically have many dozens of threads performing various activities, and that to understand performance changes over time, one needs to inspect samples from at least several points in time. In this scenario, a tool can easily overwhelm a human with too much information. The fundamental problem is that the profile data lacks abstraction: there are too many distinct concrete methods in play, and a user cannot easily digest profile information spanning thousands of methods. While an expert with experience and intuition can probably navigate the raw data and diagnosis a problem, this task is usually too difficult for mere mortals.

To address this problem, a methodology of the present disclosure in one embodiment analyzes the sample data and produces an abstract model of the application behavior, designed to illuminate bottlenecks. The analysis uses a set of expert rules to infer a hierarchical categorization of the state of threads across time. The rules depend on the participation of a thread in the monitor graph, and the names of methods on its call stack.

In one aspect, the analysis machinery may be simple and run quickly, relying on pattern-matching and decision trees. However, the expert rules embody sophisticated understanding of various Java™ frameworks.

Figures 6, 8:
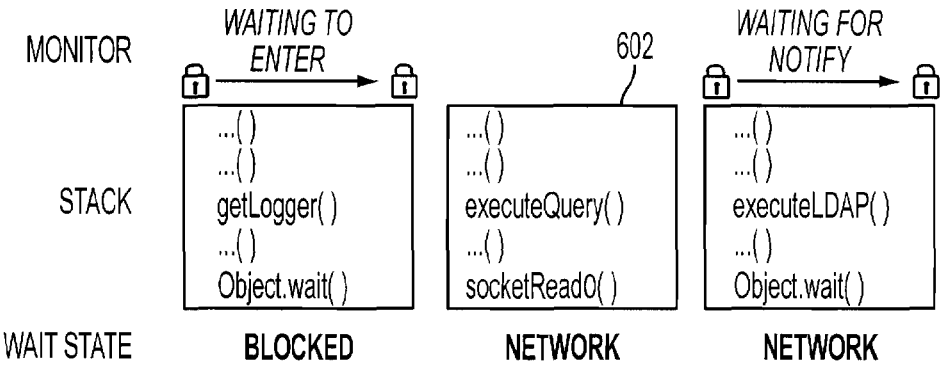
FIG. 6 illustrates examples of Wait States for samples inferred from information that includes monitor states and stack sample context inferences in one embodiment of the present disclosure.
FIG. 8 shows a call stack mapped to a stack of categories in one embodiment of the present disclosure.

At its coarsest level, the analysis assigns each thread an abstract state called a Wait State. A thread's Wait State specifies whether it is able to make forward progress, and if not, the nature of the hold up. Each state, such as "Blocked", "Disk", "GC", and "Network", represents a general class of delays, independent of application level details. In this way, the Wait States serve the same purpose as the conventional run states, but provide a richer semantics that helps identify bottlenecks. FIG. 6 gives example inferences of Wait States. For a given example call stack associated with a trading application, the analysis would infer the Wait State "Network', as the stack matches the pattern shown at 602 in FIG. 6.

For each stack frame, a methodology of the present disclosure in one embodiment may compute an abstraction called a Category that represents the code or activity being performed by that method invocation. For example, a method invocation could indicate application-level activity such as Database Query, Client Communication, or JDBC Overhead. The methodology of the present disclosure in one embodiment may further label each stack sample with a Primary Category which best characterizes the activity being performed by an entire stack at the sampled moment in time.

The abstract model of activity forms a hierarchy: a Wait State gives a coarse but meaningful abstraction of a class of behaviors. For more information, one can "drill down" through the model to see finer distinctions based on Primary Categories, stacks of Categories, and concrete stack samples without abstraction. This hierarchy provides a model for a user interface, which provides a high-level overview and the ability to drill down through layers of abstraction to pinpoint relevant details.

The present disclosure in one embodiment provides for computing the abstraction described above based on a set of rules. The rules in one embodiment are defined declaratively by an expert based on knowledge of common methods in standard library and middleware stacks. Statistics and case studies indicate that the methodology is practical, and successfully identifies diverse sources of idle time.

Hub Sampling is described in one embodiment in more detail herein. A methodology of the present disclosure in one embodiment relies on samples of processor activity and of the state of threads, for instance, in a JVM. The methodology of the present disclosure in one embodiment may take samples from the hub process (e.g., application server) of a multi-tier application, but can also collect data from any standard Java™ environment. Despite collecting no data from the other tiers, information from a hub process illuminates multi-tier bottlenecks.

The following describes how a methodology of the present disclosure in one embodiment may collect information from a Java™ hub, for example, step 104 in FIG. 1A.

Sampling Mechanisms

A methodology of the present disclosure in one embodiment utilizes a collecting mechanism that is a low barrier to entry, since, many, if not most, potential users will reject any changes to deployment scripts, root permissions, kernel changes, specific software versions, or specialized monitoring agents. A methodology of the present disclosure in one embodiment collects samples of processor utilization, process utilization, and snapshots of Java™ activity using built-in mechanisms that are available on nearly every deployed Java™ system. Table 1 summarizes the mechanisms by which such a system may collect data.

TABLE 1

| Data | UNIX | Windows |
| --- | --- | --- |
| machine utilization | vmstat | typeperf |
| process utilization | ps | tasklist |
| Java ™ state | kill -3 | sendsignal |

Table 1 shows examples of the built-in mechanisms used in the present disclosure to sample the Java™ hub. Note "kill-3" does not terminate the signaled process, and 3 is the numeric code for SIGQUIT.

A methodology of the present disclosure in one embodiment may also produce meaningful results with partial data. In practice, data sometimes arrives corrupted or prematurely terminated, due to a myriad of problems. For example, a target machine may run out of disk space while writing out data, the target JVM may have bugs in its data collection, or there may be simple user errors. If any of the sources of data described are incomplete, the methodology of the present disclosure in one embodiment may produce the best possible analysis based on the data available.

Processor Utilization

Most operating systems support non-intrusive processor utilization sampling. A methodology of the present disclosure in one embodiment attempts to collect time series of processor utilization at three levels of granularity: (1) for the whole machine, (2) for the process being monitored, and (3) for the individual threads within the process. For example, on UNIX platforms the methodology of the present disclosure in one embodiment may use vmstat and ps to collect this data.

Java™ Thread Activity

To monitor the state of Java threads, a methodology of the present disclosure in one embodiment may rely on the support built into JVMs to dump "javacore" files. The methodology of the present disclosure in one embodiment may support (parse) the javacore format produced in a system, for example, by IBM™ JVMs and the HotSpot JVM. The data that may be used to help diagnose process failures and deadlock can be sampled by issuing a signal to a running JVM process. Upon receiving this signal, the JVM stops running threads, and then writes out the information specified in FIG. 5. The JVM forces threads to quiesce using the same "safe-point" mechanism that is used by other standard JVM mechanisms, such as the garbage collector.

IBM™ JVMs can produce javacore samples with fairly low perturbation. For a large application with several hundred threads with deep call stacks, writing out a javacore file may pause the application for several hundred milliseconds. As long as samples occur infrequently, writing javacores has a small effect on throughput. When the hub of a multi-tier application spans multiple processes, possibly running on multiple machines, a methodology of the present disclosure in one embodiment may choose one hub process at random. Thus, the methodology of the present disclosure may be applicable in multi-process environment, including cloud environment.

The run states provided by the JVM and operating system are often inconsistent or imprecise, due to several complications. The first problem is that many JVM implementations quiesce threads at safepoints before dumping the javacore. Threads that are already quiesced (e.g., waiting to acquire a monitor) will be reported correctly as having a conventional run state of Blocked. However, any thread that was Runnable before triggering the dump will be reported to have a false run state of CondWait, since the thread was stopped by the JVM before writing the javacore file.

The boundary between the JVM and the operating system introduces further difficulties with thread run states. The JVM and operating system (OS) each track the run state of a thread. The JVM may think a thread is Blocked, while the OS reports the same thread Runnable, in the midst of executing a spin-lock. Spinning is sometimes a detail outside the JVM's jurisdiction, implemented in a native library called by the JVM. Similarly, the JVM may report a thread in a CondWait state, even though the thread is executing system code such as copying data out of network buffers or traversing directory entries in the filesystem implementation.

Even if conventional run states were perfectly accurate, they often help little in diagnosing the nature of a bottleneck. Consider the conventional CondWait run state. One such thread may be waiting at a join point, in a fork join style of parallelism. Another thread, with the same CondWait run state, may be waiting for data from a remote source, such as a database. A third such thread may be a worker thread, idle only for want of work. For these reasons, a methodology of the present disclosure in one embodiment may instead compute on a richer thread state abstraction that distinguishes between these different types of states.

The following describes a hierarchical abstraction of execution state. A methodology of the present disclosure in one embodiment may include an analysis that maps concrete program execution states into an abstract model, designed to illuminate root causes of idle time. The details of the abstraction hierarchy arise from a declarative specification. The analysis in one embodiment maps each sampled thread into an abstract state, which includes a pair of two elements called the Wait State and a stack of Categories. A Wait State encapsulates the status of a thread regarding its potential to make forward progress, while the a Category represents the code or activity being performed by a particular method invocation.

The Wait State Abstraction

The Wait State abstraction groups thread samples, assigning each sample a label representing common cases of forward progress (or the lack thereof). FIG. 7A shows an example of the hierarchy of Wait States which cover all possible concrete thread states. The analysis maps each concrete thread sample into exactly one node in the tree.

At the coarsest level of the hierarchy 702, the Wait State of a sampled thread indicates whether that thread is currently held up or making forward progress: Java threads may be either Waiting 704 or Runnable 706. A third possibility may cover a thread executing native code (e.g., non-Java™) that may not be characterized, in which case the thread is assigned Wait State Native Unknown 708.

For Java™ threads, the analysis partitions Waiting 704 and Runnable 706 into finer abstractions 710, which convey more information regarding sources of idle time. For example, a Waiting thread might be waiting for data from some source (Awaiting Data), blocked on lock contention (Contention), or has put itself to sleep (Sleeping). As shown in FIG. 7, finer distinctions 712 are also possible. Consider a Sleeping thread: this could be part of a polling loop that contains a call to Thread.sleep (Poll); it could be the join in a fork join style of parallelism (Join); or it could be that the thread is a worker in a pool of threads, and is waiting for new work to arrive in the work queue (Awaiting Notification).

Distinctions in Wait States may give a good first approximation of common sources of idle time in server applications. Furthermore, differences in Wait States may indicate fundamentally different types of problems that lead to idle time. A server application suffering from low throughput due to insufficient load would have many threads in the Awaiting Notification state. The solution to this problem might, for example, be to tune the load balancer. A system that improperly uses Thread.sleep suffers from a problem of a completely different nature. Similarly, having a preponderance of threads waiting for data from a database has radically different implications on the system health than many threads, also idle, suffering from lock contention.

Thus, the Wait State gives a high-level description of the root cause of idle time in an application. The second part of the abstraction, the Category stack, gives a finer abstraction for pinpointing root causes.

The Category Abstraction

The Category abstraction in one embodiment assigns each stack frame a label representing the code or activity being performed by that method invocation. Category names provide a convenient abstraction that summarizes nested method invocations that implement larger units of functionality. Note that since each stack frame maps to a Category, each stack contains representatives from several Categories. To understand behavior of many stacks at a glance, it is useful to assign each stack a primary Category, which represents the Category which provides the best high-level characterization of the activity of the entire stack. For example, in an example stack sample, a JDBC Category may be chosen as the primary Category, based on priority logic that determines that the JDBC Category label conveys more information than other Categories in the stack, such as Networking or WebContainer.

FIG. 7B shows an example of a subset of the Categories that may be modeled or established. As with Wait States, the Category abstract states form a tree. The primary distinction is drawn between activities, which name what a method is doing, and nicknames for common libraries and frameworks. Common activities include sorting and marshalling data, such as occurs in the handling of the extensible markup language (XML) data of Simple Object Access Protocol (SOAP) requests. Server applications may have dozens of administrative (Admin, in the figure) activities. These activities include background logging threads, cache eviction threads, and alarm threads that periodically probe for changes of files stored on disk.

Category abstraction which reflects activities in well-known software components may be incomplete with respect to non-framework application code. A methodology of the present disclosure in one embodiment may include Category assignment, in the case of insufficient coverage of Category names. For example, a methodology of the present disclosure in one embodiment may assign "Code Nickname" 714 to application or software packages 714. In one embodiment, a methodology of the present disclosure allows a practitioner to define new Category abstractions declaratively, in the specification of the analysis expert rules system.

As shown in FIG. 7A and FIG. 7B, every concrete state, a sampled thread, may map to a pair of abstract states: a Wait State and a stack of Categories (one per frame). Every frame in a call stack may have a default name based on the invoked package, e.g., com.MyBank login( ) would be named MyBank Code.

FIG. 8 gives an example call stack, and the corresponding Category stack. The call stack is mapped to a stack of Categories, from which a primary Category (Database Communication) is chosen. For example, a call to the socketRead0 method belongs to the code that has been nicknamed Network. The com.mybank code has no nickname, nor known activity, and so is assigned its default name MyBank Code. The primary Category of this call stack is the highlighted Database Communication activity.

Declarative rules indicate priorities used to choose the primary label for a stack. Sometimes the appropriate choice of priorities varies depending on who views the report. For example, in FIG. 8, if a network analyst were the primary viewer of the output, Network might be a better choice as the primary Category.

Wait State Analysis Definition

The above description informally introduced the abstraction. The following states more precisely the analysis performed by a methodology of the present disclosure in one embodiment:

DEFINITION 1 (Wait State Analysis). Let k be the maximum stack depth of sampled threads, W be the tree of Wait States and C be the tree of Categories. We define a wait state analysis as a function that maps each sampled concrete thread state to an abstract state $(w, c) \in W \times C^k$. We say that w is the Wait State of a sampled thread, and c, its Category Stack, is a tuple whose components correspond to frames in the sampled call stack.

DEFINITION 2 (Category Priorities and Primary Category). Let the call stack of a sampled thread contain methods $m_1, \ldots, m_k$, and the output of a wait state analysis be (w, c), where the Categories are $c=[c_1, \ldots, c_k]$. Each element of the Category mapping, $m_i \rightarrow c_i$, has a priority $p_i$. The primary Category used by the sampled thread is that $c_i$ with maximum priority, and, in the case of ties, the one closest to the leaf invocation $m_1$.

The abstract model provides a backbone for progressive disclosure of details regarding thread activity, at a sampled moment in time. In practice, it may be most useful to start by clustering stack samples according to Wait State. A user request to focus on particular Wait States results in the navigation to a view that clusters the stack samples in that Wait State according to their primary Category. In this way, navigation of a user interface corresponds directly to traversals of the tree-structured abstract model.

Analyzer

An engine is now described that computes the analysis defined above. The analysis engine has three steps in one embodiment: 1) parse and transform the raw data, 2) infer Categories, and then 3) infer Wait States.

ETL Step

A methodology of the present disclosure in one embodiment may take input that includes raw javacore samples and raw output of machine utilization utilities. A pre-pass to the analysis performs an Extract-Transform-Load (ETL) step that parses the raw data and transforms it to a canonical form, which abstracts away irrelevant details that vary from platform to platform.

FIG. 9 provides a more detailed summary of the raw data available in a javacore thread sample, including the name of thread sampled, its native thread identifier (e.g. on UNIX, this turns out to be the address of the corresponding pthread data structure), the call stack as a list of method names, and information about how this thread interacts with the monitors. The raw input from stack sampling may provide this data for each sampled thread. Each monitor and thread has a hexadecimal address and a name (not shown).

The ETL step consumes this data and produces the data model or data structure shown in FIG. 10. First, a methodology of the present disclosure may compute equivalence classes of thread samples, where two thread samples are considered equivalent if they represent the same stack of methods and locking status. FIG. 10 labels these equivalence classes as call stack clusters. FIG. 10 illustrates the input concrete data model, after clustering and optimization. This example shows that cluster c1 (1002), which occurred 3592 times across all application samples, was invoked in thread t3 in the second application sample (1004) (sample index 2).

The output model represents the data in a tabular fashion, similar to a relational database. Other format for the data model may be possible. Viewing the count row of the call stack clusters table in FIG. 10 reveals that cluster c1 occurred 3592 times across all application samples. Viewing table "blocked" 1006 in FIG. 10 indicates that in the first and last application samples, cluster c1 was waiting to enter the critical section guarded by monitor m2. Viewing the "owned by" table 1008 in turn reveals that m2 was owned by cluster c2. In other words, thread stack c1 was blocked on a monitor held by thread stack c2.

Category Analysis

A methodology of the present disclosure in one embodiment may rely on a pattern-matching system, driven by a set of rules to determine the Category label for each stack frame. The A methodology of the present disclosure in one embodiment may rely on a simple declarative specification of textual patterns that define Categories. The declarative rules that define the Category analysis define two models. The first model is a Category Tree, such as the one shown in FIG. 7B. A Category Tree provides the namespace, inheritance structure, and prioritization of the Category abstractions that are available as method labels. The second model is a set of rules. Each rule maps a regular expression over method names to a node in the Category Tree. For example, FIG. 11 shows rules that, in part, define Database activity. The rules distinguish between five aspects of database activity: queries, batch queries, commits, rollbacks, iteration over result sets. This example illustrates how it is easy to define a Category Tree that is more precise than the one shown in FIG. 7B.

Given these rules, the Category analysis engine iterates over every frame of every call stack cluster, looking for the highest-priority rule that matches each frame. In one embodiment, every method has an implicit Category, its package which is assigned to the Category's Code Nickname. Thus, if no Category rule applies to a frame, then the methodology of the present disclosure in one embodiment forms an ad hoc Category for that frame: a method P1/P2/P3/ . . . /Class.Method receives the Code Nickname P2 Code.

Wait State Analysis

In addition to inferring Categories, methodology of the present disclosure in one embodiment infers a Wait State as illustrated in FIG. 7A. The analysis to infer Wait States in one embodiment combines three sources of information: processor utilization, the concrete data model (an example of which is shown in FIG. 10), and rules based on method names. The rules over method names, in some cases, may need the inspection of multiple frames in stack. This differs from the Category analysis, where each frame's Category is independent of other frames.

The main challenge in using method names to infer a Wait State concerns handling imperfect knowledge of an application's state. For instance, the true Wait State of a sampled thread is, in many cases, not knowable. To fill this knowledge gap, the methodology of the present disclosure in one embodiment may use expert knowledge about the meaning of activities, based on method names. In one aspect, many aspects of Wait States depend on the meaning of native methods, and the use of native methods does not vary greatly from application to application.

An algorithm for inferring proceeds as a sieve, looking for the Wait State that can be inferred with the most certainty. The algorithm uses data from the concrete data model (e.g., shown in FIG. 10) as well as a set of rules over method names, specified declaratively with patterns (analogous to the Category Analysis).

The Wait State of a given call stack cluster c at sample index i is the first match found when traversing the following conditions, in order:

1. Deadlock: if this stack cluster participates in a cycle of lock contention in the monitor graph; i.e., there is a cycle in the Blocked and Owned By relations.
2. Lock Contention: if the stack cluster, at the moment in time of sample i, has an entry in the Blocked relation.
3. Awaiting Notification: if the stack cluster, at the moment in time of sample i, has an entry in the Waiting relation.
4. Spinlock: if the Wait State rule set defines a method in c that with high certainty, implies the use of spinlocking Many methods in the java.util.concurrent library fall in this high-certainty category.
5. Awaiting Data from Disk, Network: if the rule set matches c as a use of a filesystem or a network interface. Most such rules need only inspect the leaf invocation of the stack, e.g. a socketRead native invocation is an indication that this stack sample cluster is awaiting data from the network. In some cases, requests for data are dispatched to a "stub/tie" method, as is common in LDAP or ORB implementations.
6. Executing Java Code: if the method invoked by the top of the stack is not a native method, then c is assumed to be Runnable, executing Java code.
7. Executing Native Code: if the method invoked by the top of the stack is a native method, and the rule set asserts that this native method is truly running, then the methodology of the present disclosure in one embodiment may infer that the native method is Runnable. The methodology of the present disclosure in one embodiment may treat native and Java™ invocations asymmetrically, to increase robustness. A Java™ method, unless it participates in the monitor graph, is almost certain to be Runnable. The same cannot be said of native methods. Native methods more often than not, serve the role of fetching data, rather than executing code. Therefore, the methodology of the present disclosure in one embodiment may require native methods to be whitelisted in order to be considered Runnable.
8. JVM Services: if c has no call stack, it is assumed to be executing native services. Any compilation and Garbage Collection threads, spawned by the JVM itself, fall into this category. Even though these call stack samples have no call stacks, and unreliable thread states, they participate in the monitor graph. Thus, unless they are observed to be in a Contention or Awaiting Notification state, the methodology of the present disclosure in one embodiment may assume they are Runnable, executing JVM Services.
9. Poll, IOWait, Join Point: if there exists a rule that describes the native method at the top of the stack as one of these variants of Sleeping.
10. NativeUnknown: any call stack cluster with a native method at the top of the stack and not otherwise classified is placed into the NativeUnknown Wait State. This classification is in contrast to call stack clusters with Java™ leaf invocations, which are assumed to be Runnable. For robustness, the algorithm in one embodiment may require call stacks with native leaf invocations to be specified by rules to be in some particular Wait State. This allows users to quickly spot deficiencies in the rule set. In practice, the methodology of the present disclosure in one embodiment for handling of native methods is robust enough that this state fires rarely.

Rules for Wait States

The syntax for declaring Wait State rules is more general than that for Category rules in one embodiment, which depend on exactly one method name. In particular, rules can specify antecedents which depend on a conjunction of frame patterns appearing together in a single stack, as illustrated in FIG. 12. For convenience, the rules engine allows a declarative specification of tags, which are auxiliary labels which can be attached to a stack to encode information consumed by other rules which produce Wait States. FIG. 12 at 1202 shows an example that matches against two frames, and relies on an auxiliary tag (% CondVar) which labels various manifestations of waiting on a condition variable.

Rule Coverage

The present disclosure provides for a stable, and possibly small, set of rules that can achieve good coverage on range of diverse inputs. For the Category analysis, a small number of rules are used to capture a wide range of Categories. Table 4 at (a) characterizes most of the Category rules that may be defined. For example, a rule set may cover five common JDBC libraries, including IBM™ DB2 and Microsoft™ SqlServer, with only 72 rules. The number of rules specific to a particular JDBC implementation lies on the order of 10-20, as shown in Table 4 at (b). The rules are stable across versions of any one implementation. For example, the same set of rules may cover known versions and platforms of the DB2™ JDBC driver, for example, three versions of the code and four platforms.

TABLE 3

| Wait Sate Rule | #Rules |
| --- | --- |
| Waiting on Condition Variable | 26 |
| Native Runnable | 22 |
| Awaiting Data from Disk, Network | 16 |
| Spinlock | 12 |

TABLE 4

| (a) Rules, by Category | | (b) Database, by provider | |
| --- | --- | --- | --- |
| Category | # Rules | Category | # Rules |
| Database | 72 | DB2 | 18 |
| Administrative | 59 | MySQL | 14 |
| Client Communication | 41 | Oracle | 12 |
| Disk, Network I/O | 46 | Apache | 8 |
| Waiting for Work | 30 | SqlServer | 6 |
| Marshalling | 30 | | |
| JEE | 22 | | |
| Classloader | 13 | | |
| Logging | 12 | | |
| LDAP | 6 | | |

A Software Tool/System

The methodology of the present disclosure, for example, based on the abstractions and analyses described above, may be implemented as a software-as-a-service deployed in a computer system infrastructure. The tool further may include a user interface module that may provide various information and interactions with a user, for instance.

Tool Architecture

In general, the tool is designed to have a low barrier to entry, to be simple and easy to use. The tool may be implemented as a service. Using the tool may involve three steps:
1. Collect one or more javacores. This can be done manually, or by using a data collection script the methodology of the present disclosure in one embodiment may generate that collects machine utilization and process utilization.
2. Upload the collected data to a server through a web interface.
3. View the report in a browser.

A service architecture may offer the following advantages:

Zero-install. The user can use the methodology of the present disclosure without having to install any software.

Easy to collaborate. A report can be shared and discussed by forwarding a single URL.

Incrementally refined knowledge base. By having access to the data submitted to the service, a service team can monitor the reports being generated and continually improve the knowledge base when existing rules prove insufficient.

Cross-report analysis. Having access to a large number of reports allows looking for trends that may not stand out clearly in a single report.

A service-based tool includes a network connection to the server, for example, from a customer site. Privacy concerns with uploading the data to a central server may be mitigated by a server behind a corporate firewall. A clone service may be also deployed on a client's own server to satisfy more strict privacy requirements.

User Interface

Figure 13:
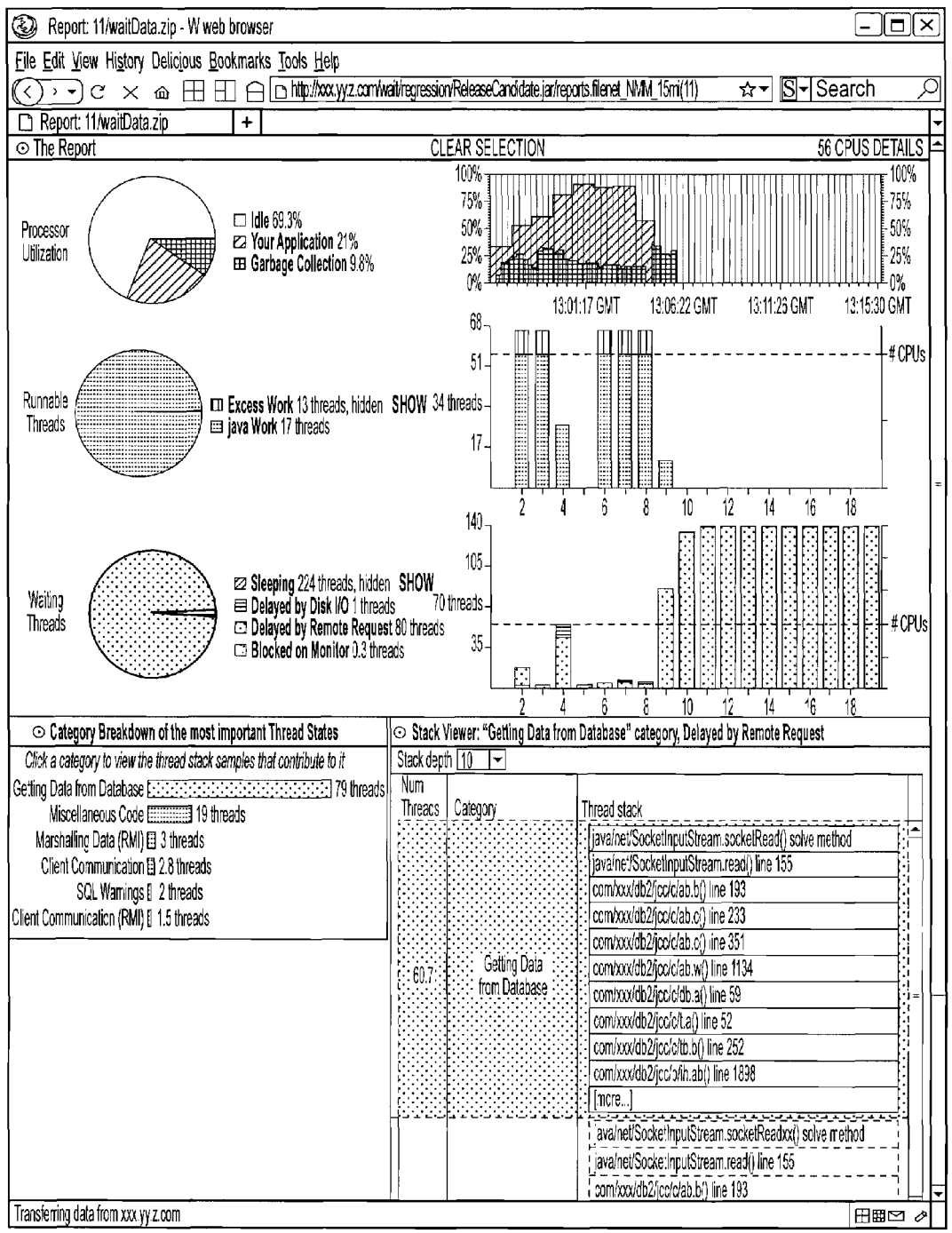
FIG. 13 illustrates an example report in one embodiment of the present disclosure.

FIG. 13 shows a screenshot of a report being viewed in a Web Browser, e.g., Mozilla Firefox™. The report is intended to be scanned from top to bottom, as this order aligns with the logical progression of questions an expert would likely ask when diagnosing a performance problem.

Activity Summary

The top portion of the report presents a high-level view of the application's behavior. The pie charts on the left present data averaged over the whole collection period, while timelines on the right show how the behavior changed over time. The top row shows the machine utilization during the collection period, breaking down the activity into four possible categories: Your Application (the Java™ program being monitored), Garbage Collection, Other Processes, and Idle. This overview appears in the report first because it represents the first property one usually checks when debugging a performance problem. In this particular report, the CPU utilization drops to zero roughly ⅓ of the way through the collection period, a common occurrence when problems arise in a multi-tier application.

The second and third rows report the Wait State of all threads found running in the JVM. The second row shows threads that are Runnable, while the third row shows threads that are Waiting. Each bar in the timeline represents the data from one Javacore. This example shows as many as 65 Runnable threads for the first 8 javacores taken, at which point all runnable activity ceased, and the number of Waiting threads shot up to 140, all in Wait State Delayed by Remote Request. This label corresponds to the "Awaiting Data" in FIG. 7A. Skimming the top portion of the report enables a user to quickly see that CPU idle time follows from threads backing up in a remote request to another tier.

Category Viewer

The lower left hand pane of the report shows a breakdown of most active Categories executing in the application. Clicking on a pie slice or bar in the above charts causes the Category pane to drill down, showing the Category breakdown for the Wait State that was clicked. This report shows that all but one of the threads in Wait State Delayed by Remote Request were executing Category Getting Data from Database. This indicates that the source of this problem stems from the database becoming slow or unresponsive. The utility of the tool may stem from the ease with which the user can narrow down the problem to the database, without having even looked at logs from the database machine.

Stack Viewer

Glancing at the commonly occurring Wait States and Category activity often suffices to rapidly identify bottlenecks; however, the tool may provide one additional level of drill-down. Selecting a bar in the report opens a stack viewer pane to display all call stacks that match the selected Wait State and Category. Stacks are sorted by most common occurrence to help identify the most important bottlenecks. Having full stack samples available has proven valuable not only for understanding performance problems, but for fixing them. The stacks allow mapping back to source code with full context and exact lines of code where the backups are occurring. Passing this information on to the application developers is often sufficient for them to identify a fix. The presence of thread stacks makes the tool useful not only for analyzing waiting threads, but also for identifying program hot spots. Clicking on the Runnable Threads pie slice causes the Stack Viewer to display the most commonly occurring running threads. Browsing the top candidates often produces surprising results such as seeing "logging activity" or "date formatter" appear near the top, suggesting wasted cycles and easy opportunities for streamlining the code.

In one aspect, the user interface of the present disclosure may take minimalistic approach, striving to present a small amount of semantically rich data to users rather than overloading them with mountains of raw data. The tool may be effective for quick analysis of performance problems. The pairing of the analyses together with drilldown to full stack traces has proven to be a powerful combination. The abstractions of the present disclosure guide the user's focus in the right direction, and present a set of concrete thread stacks that can be used to confirm the hypotheses. A user also may view the full stack traces to quickly confirm the abstractions.

The methodology of the present disclosure in one embodiment may be coded in a combination of Java™ and Javascript. The ETL step of parsing the raw data and producing the data model (e.g., FIG. 2 at 208 and 210) may run in Java™ and execute on the server once, when a report is created. The remaining analyses (Wait State analysis and Category analysis) may run in Javascript and execute in the browser (e.g., FIG. 2 at 204) each time a report is loaded. This design may allow users to modify the rules or select alternate rules configurations without a round trip to the server. This design also allows reports, once generated, to be viewed in headless mode without a server present; the browser can load the report off a local disk and maintain full functionality of the report. Other design configurations are possible.

Lock Contention and Deadlock

Figure 14:
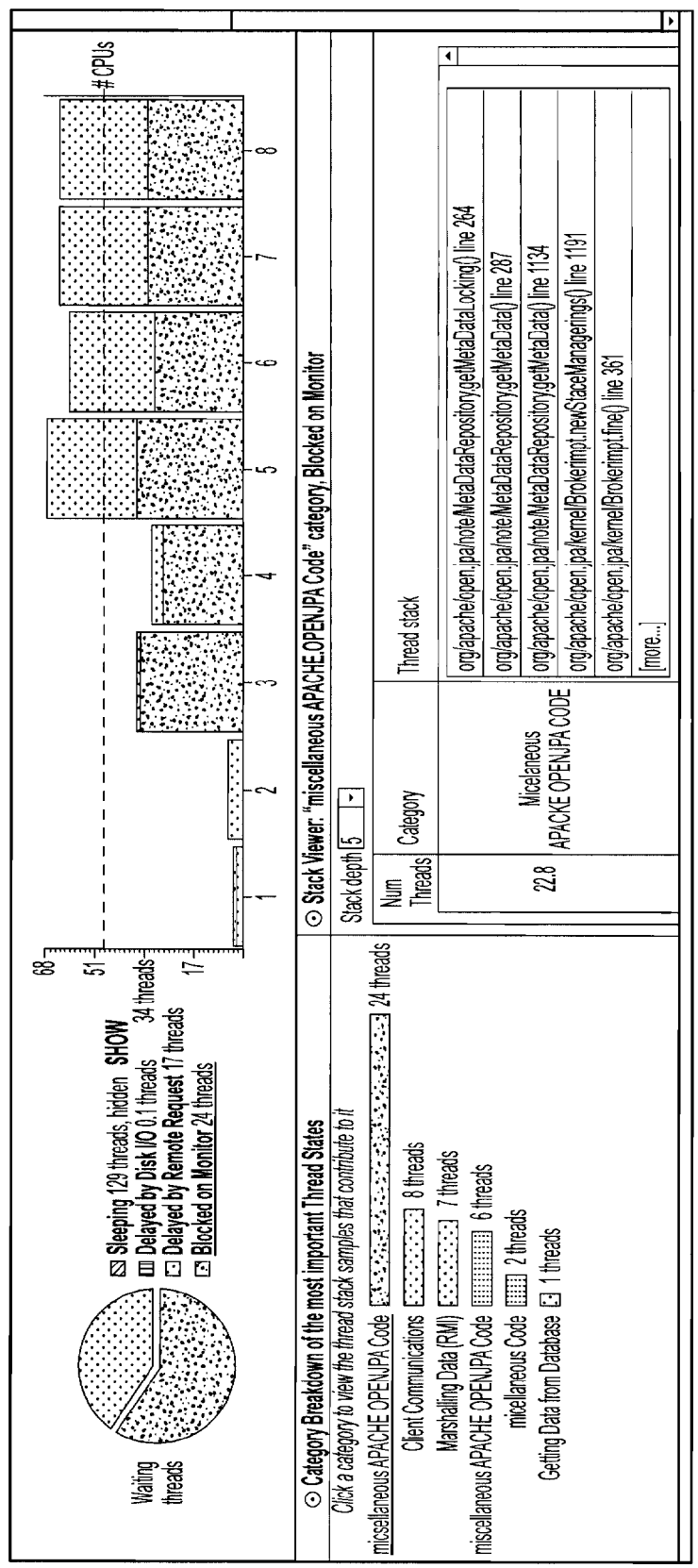
FIG. 14 illustrates an example lock contention report in one embodiment of the present disclosure.
Figure 15:
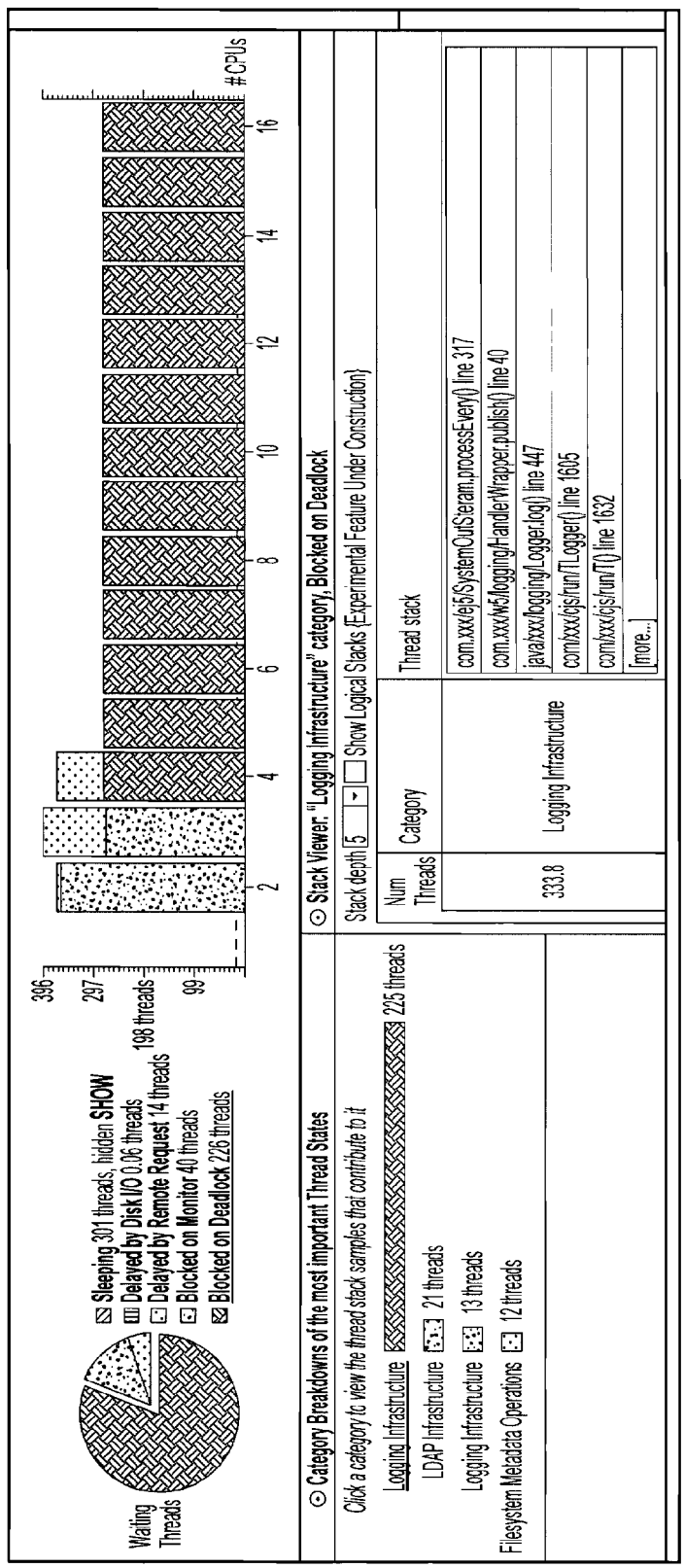
FIG. 15 illustrates an example deadlock report in one embodiment of the present disclosure.

FIG. 14 illustrates a sample report on a 48-core system. The Waiting Threads timeline shows a sudden and sustained surge of Blocked on Monitor; i.e. threads seeking a lock and not receiving it, and thus being blocked from making progress. Looking at the Category breakdown suggests that lock contention comes from miscellaneous APACHE OPENJPA Code. The thread stacks from this category identify the location of the lock contention as line 364 of getMetaDataLocking( ). Sometimes locking issues go beyond contention to the point of deadlock or livelock. When the tool of the present disclosure detects a cycle in the monitor graph, their Wait State is Blocked on Deadlock. This situation appears in FIG. 15. Looking at the thread stacks at the lower right of the report suggests that the threads are waiting for a lock in the logging infrastructure method SystemOutStream.processEvent( ) line 277. With this information, a programmer could look at the code and try to determine the reason for the deadlock.

Not Enough Load

Figure 16:
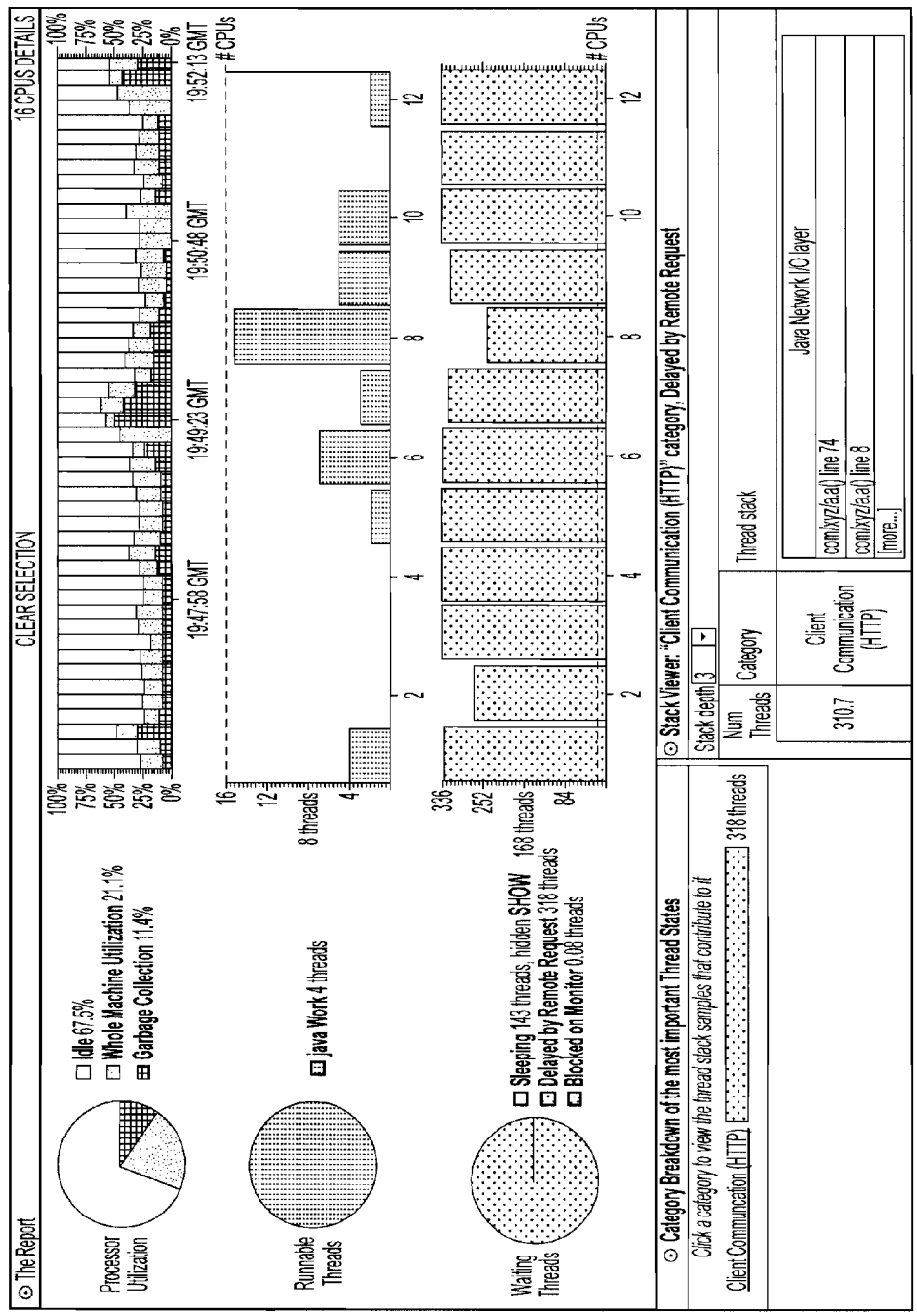
FIG. 16 illustrates an example report that shows not enough load, in one embodiment of the present disclosure.

The example report shown in FIG. 16 shows that the machine was 67% idle, and the timeline confirms that utilization was consistently low during the entire monitoring period. The Waiting Threads piechart indicates that threads spend most of their time Delayed by Remote Request. Digging more deeply, the Category view indicates that the remote request on which the threads are delayed is client communication using an HTTP protocol. In this case, the performance problem is not with the server machine, but that the amount of data being received from the client machine is not sufficient to keep the server busy. Indeed it is possible that there is no problem in this situation, other than that the server may be over provisioned for this workload. To determine whether the client is generating a small amount data or if the network between the client and server is under-provisioned to handle the request traffic, a network utility such as netstat could be employed, or the CPU utilization of client machines could be investigated.

Memory Leak

Figure 17:
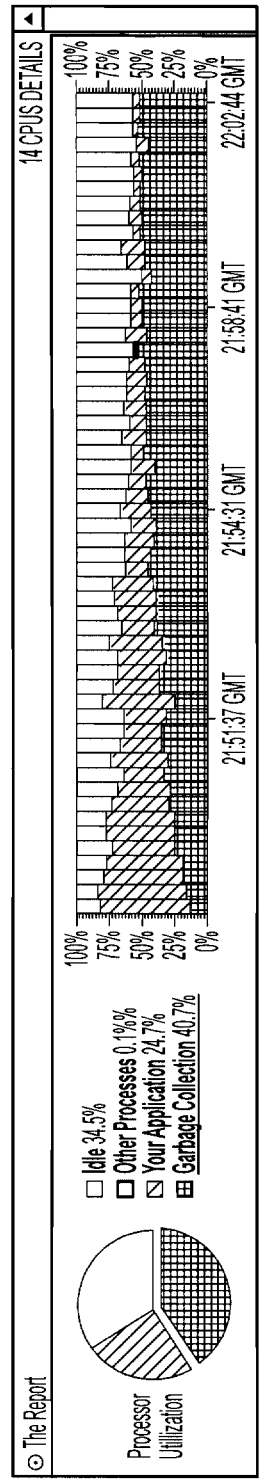
FIG. 17 illustrates an example report that show memory leak in one embodiment of the present disclosure.

The tool of the present disclosure may also detect memory leaks. As shown in FIG. 17, a memory leak can be detected by looking at just the first timeline, which shows garbage collection activity over time. In this example, initially the non-GC work dominates, but over time the garbage collection activity increases until it eventually consuming most of the non-idle CPU cycles. The large increase in garbage collection as time passes is strong evidence that the heap is inadequate for the amount of live memory; either the heap size is not appropriate for the workload, or that the application has a memory leak.

Database Bottleneck

Figure 18:
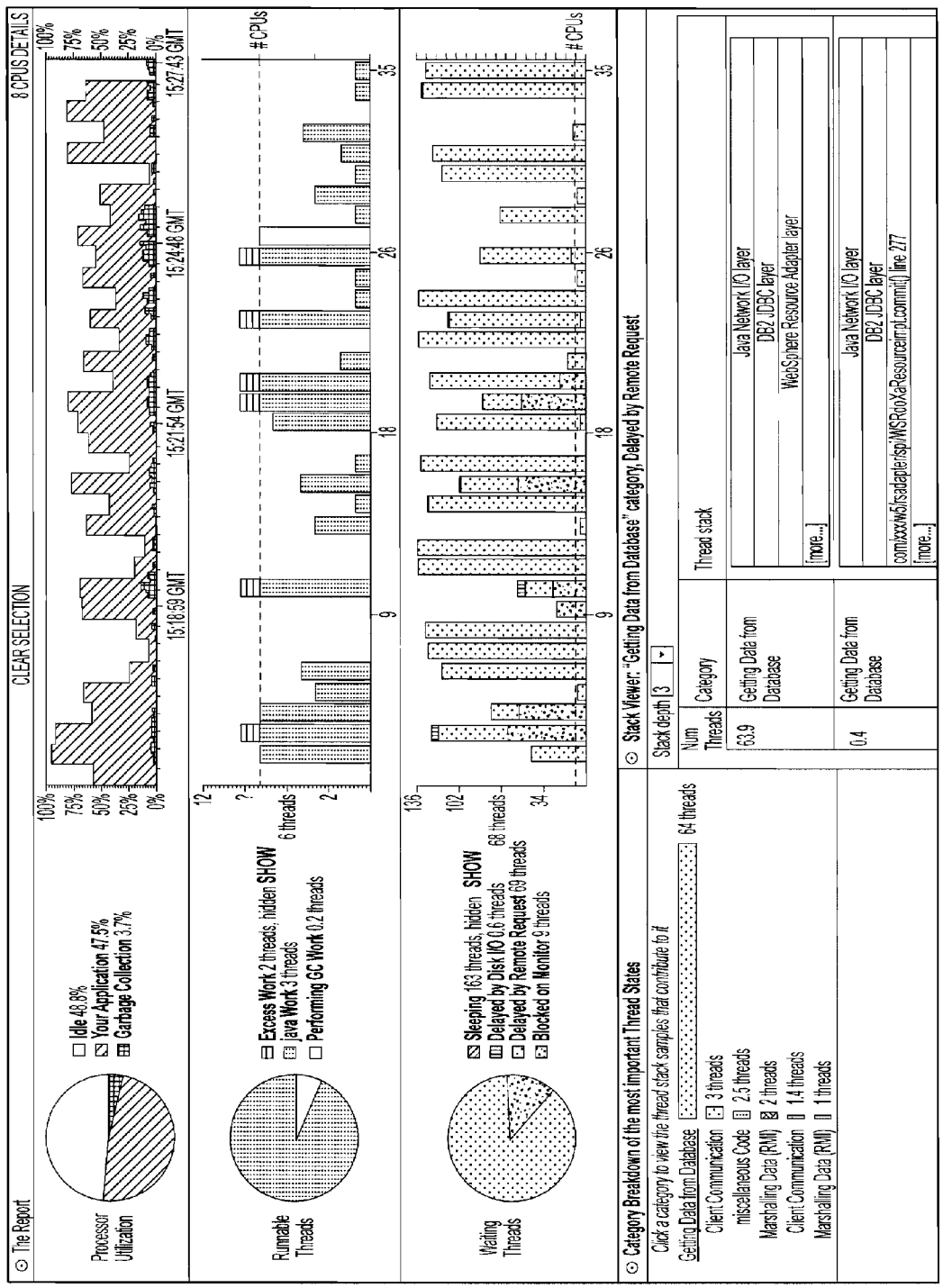
FIG. 18 illustrates an example of a database bottleneck report in one embodiment of the present disclosure.

FIG. 18 presents an example of a database bottleneck. Unlike FIG. 13 where the database became completely unresponsive, in this case the database is simply struggling to keep up with the application server's requests. Over time the server's utilization varies between approximately 10% and 85%, and these dips in utilization correlate roughly with the spikes in the number of threads in Waiting state Delayed by Remote Request and Category Getting Data from Database, thus pointing to the likely source of the delay. Clicking on the orange bar for Getting Data from Database reveals the thread stacks that a developer can analyze to determine key parts of the application delayed by the database, and try to reduce the load generated against the database. Alternatively, the database could be optimized or deployed on faster hardware.

Disk I/O Affecting Latency

Figure 19A:
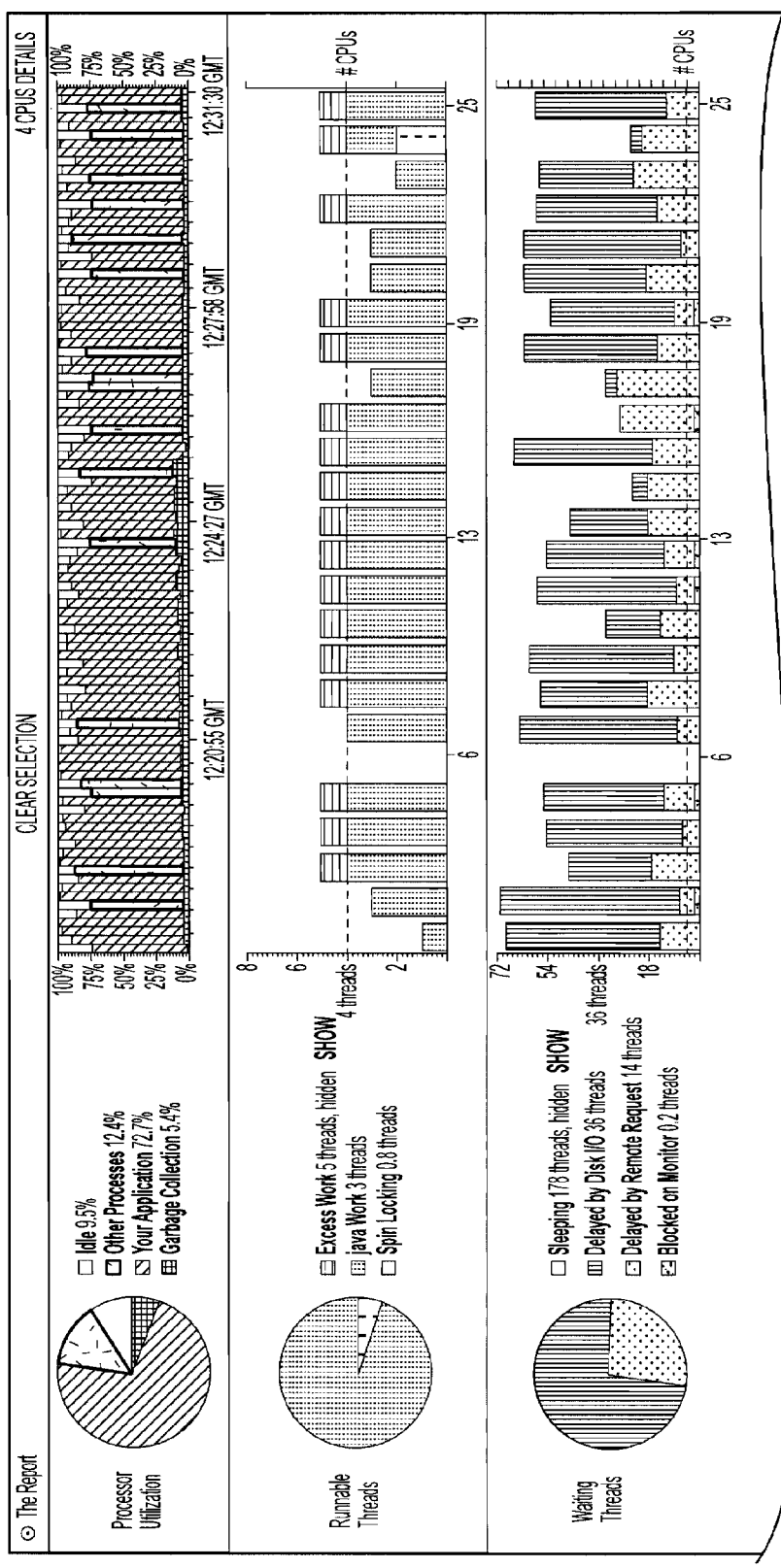
FIG. 19 illustrates an example report that shows a good throughput but filesystem bottleneck in one embodiment of the present disclosure.

FIG. 19 shows an example report where filesystem activity is limiting performance. The top two pie charts and timelines show that there is enough Java™ code activity to keep the CPUs well-utilized. However, the Waiting activity show a significant number of threads in Wait State Delayed by Disk I/O, and CategoryFilesystem Metadata Operations, suggesting room for improvement with faster disks, or by restructuring the code to perform fewer disk operations. Reducing these delays would improve latency, since each transaction would spend less time waiting on Disk I/O, but such improvement would have other benefits as well. Even though the four CPUs on this machine are currently well utilized, this application will likely scale poorly on larger machines. As the number of processors increases, the frequent disk access delays will eventually become a scaling bottleneck. The tool of the present disclosure can help identify these scaling limiters early in the development process.

The methodology of the present disclosure may be used for performance analysis of modern enterprise-class server applications as well. For instance, performance bottlenecks in these applications differ qualitatively from bottlenecks in smaller, stand-alone systems. Small applications and benchmarks often suffer from central processing unit (CPU)-intensive hot spots. Enterprise-class multi-tier applications often suffer from problems that manifest not as hot spots, but as idle time indicating a lack of forward motion. Many factors can contribute to undesirable idle time, including locking problems, excessive system-level activities like garbage collection, various resource constraints, and problems driving load.

Part of the challenges of performance analysis for modern enterprise-class server applications may stem from the fact that these systems run across multiple physical tiers, and their software comprises many components from different vendors and middleware stacks. Many of these applications support a high degree of concurrency, serving thousands or even millions of concurrent user requests. They support rich and frequent interactions with other systems, with no intervening human think time. Many server applications manipulate large data sets, requiring substantial network and disk infrastructure to support bandwidth requirements. With these requirements and complexities, such applications face untold difficulties when attempting to scale for heavy production loads. With dozens of industrial applications, every individual deployment introduces a unique set of challenges, due to issues specific to a particular configuration. Any change to key configuration parameters, such as machine topology, application parameters, code versions, and load characteristics, can cause severe performance problems due to unanticipated interactions.

Part of the challenge arises from the sheer diversity of potential pitfalls. Even a single process can suffer from any number of bottlenecks, including concurrency issues from thread locking behavior, excessive garbage collection load due to temporary object churn, and saturating the machine's memory bandwidth. Any of these problems may appear as a serialization bottleneck in that the application fails to use multiple threads effectively; however, one needs to drill down further to find the root cause. Other problems can arise from limited capacity of physical resources including disk I/O and network links. A load balancer may not effectively distribute load to application clones. When performance testing, testers often encounter problems generating load effectively. In such cases, the primary bottleneck may be processor or memory saturation on a remote node, outside the system-undertest.

Furthermore, many profiling and performance understanding tools may be inappropriate for commercial server environments. Many tools rely on restarting or instrumenting an application, which is often forbidden in commercial deployment environments. Similarly, many organizations will not deploy any unapproved monitoring agents, nor tolerate any significant perturbation of the running system. In practice, diagnosing performance problems under such constraints resembles detective work, where the analyst pieces together clues from incomplete information.

Addressing performance analysis under these constraints, the methodology of the present disclosure in one aspect performs idle time analysis, for instance, focusing on explaining idle time rather than what an application is doing. The methodology of the present disclosure may diagnose the root cause of idle time in server applications. Given lightweight samples of system (e.g., Java™) activity on a single tier, the methodology of the present disclosure may pinpoint the primary bottleneck on a multi-tier system. The methodology may center on an informative abstraction of the states of idleness observed in a running program. This abstraction allows the methodology of the present disclosure to distinguish, for example, between hold-ups on a database machine, insufficient load, lock contention in application code, and a conventional bottleneck due to a hot (busy or congested) method. To compute the abstraction, the present application also provides for an expert system based on an extensible set of declarative rules. A system or a methodology of the present disclosure for diagnosing the cause of idle time in an application (e.g., a server application) may be deployed on the fly (i.e., dynamically on a running system and application), without modifying or restarting the application.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 20:
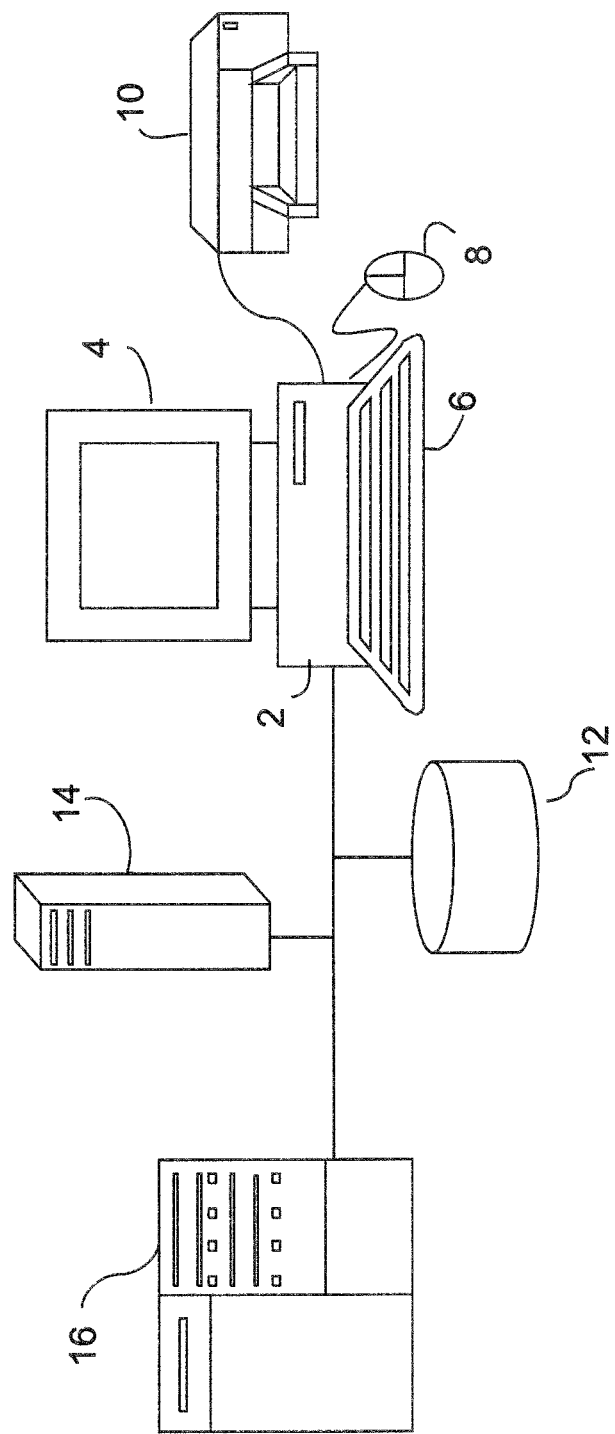
FIG. 20 illustrates an example of a computer system, in which the systems and methodologies of the present disclosure may be carried out or executed.

Referring now to FIG. 20, the systems and methodologies of the present disclosure may be carried out or executed in a computer system that includes a processing unit 2, which houses one or more processors and/or cores, memory and other systems components (not shown expressly in the drawing) that implement a computer processing system, or computer that may execute a computer program product. The computer program product may comprise media, for example a hard disk, a compact storage medium such as a compact disc, or other storage devices, which may be read by the processing unit 2 by any techniques known or will be known to the skilled artisan for providing the computer program product to the processing system for execution.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The computer processing system that carries out the system and method of the present disclosure may also include a display device such as a monitor or display screen 4 for presenting output displays and providing a display through which the user may input data and interact with the processing system, for instance, in cooperation with input devices such as the keyboard 6 and mouse device 8 or pointing device. The computer processing system may be also connected or coupled to one or more peripheral devices such as the printer 10, scanner (not shown), speaker, and any other devices, directly or via remote connections. The computer processing system may be connected or coupled to one or more other processing systems such as a server 10, other remote computer processing system 14, network storage devices 12, via any one or more of a local Ethernet, WAN connection, Internet, etc. or via any other networking methodologies that connect different computing systems and allow them to communicate with one another. The various functionalities and modules of the systems and methods of the present disclosure may be implemented or carried out distributedly on different processing systems (e.g., 2, 14, 16), or on any single platform, for instance, accessing data stored locally or distributedly on the network.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method for automatically identifying computer system performance bottlenecks and/or excess idle time, comprising:
    collecting information associated with runtime execution of a computer system;
    inferring, using a processor, one or more execution states of one or more tasks within the system based on the information,
    wherein the one or more execution states comprises one or more of runnable thread states and waiting thread states,
    wherein the inferring further comprises extracting one or more monitors, the monitors being programming objects that achieve synchronization in concurrent programming, the one or more extracted monitors providing information as to what threads are waiting on a critical section, and
    wherein the inferred one or more execution states provide information as to what a method on a stack associated with the runtime execution is doing.

2. The method of claim 1, wherein the collected information includes infrequent samples of executing tasks or the collected information specifies inaccurate execution states or combinations thereof.

3. The method of claim 1, wherein the collected information includes full traces of executing tasks.

4. The method of claim 1, wherein the step of inferring applies rule-based expert knowledge to infer the one or more execution states.

5. The method of claim 4, wherein the rule-based expert knowledge maps names of tasks to an execution state.

6. The method of claim 4, wherein the rule-based expert knowledge maps names of internal context of tasks to an execution state.

7. The method of claim 1, further including aggregating said one or more tasks by said one or more execution states for determining execution time, idle time, or system policy violations, or combinations thereof.

8. The method of claim 1, wherein the inferred execution states are further, hierarchically, subcategorized into one or more categories based on common execution tasks.

9. The method of claim 8, wherein the one or more categories include one or more of:
- a category indicating that an executing task is delayed by waiting on one or more requests the executing task has made to an external service provider,
- a category indicating that an executing task is delayed by waiting on one or more requests the t executing task has made to local disks,
- a category indicating that an executing task is delayed by waiting on data from a client machine
- a category indicating that an executing task is ready and waiting for one or more new requests to the service that the executing task provides,
- a category indicating that an executing task is waiting for one or more sub-tasks that are executing in one or more other executing tasks to complete,
- a category indicating that an executing task is currently executing work,
- a category indicating that an executing task is unable to proceed because machine resources are being used by other system facilities,
- a category indicating that an executing task is unable to proceed because machine resources are being used by another set of tasks unrelated to the executing task, or combinations thereof.

10. The method of claim 1, wherein the collected information include one or more samples of thread stacks, process stacks, or resource utilization, or combinations thereof.

11. The method of claim 1, wherein the one or more tasks include a thread, a process or combinations thereof.

12. The method of claim 1, wherein the automatically categorizing is performed by applying one or more rules based on method names found in the samples, the sample including at least thread stacks.

13. The method of claim 1, wherein the information is collected without restarting an application or altering its command-line invocation or combinations thereof.

14. A system for automatically identifying computer system performance bottlenecks using rule-based expert knowledge, comprising:
- a processor;
- a module operable to collect information associated with runtime execution of a computer system and infer one or more execution states of one or more tasks within the system based on the information,
- wherein the one or more execution states comprises one or more of runnable thread states and waiting thread states,
- wherein the module is further operable to extract one or more monitors, the monitors being programming objects that achieve synchronization in concurrent programming, the one or more extracted monitors providing information as to what threads are waiting on a critical section, and
- wherein the inferred one or more execution states provide information as to what a method on a stack associated with the runtime execution is doing.

15. The system of claim 14, further including:
an application interface operable to provide the summarized execution activity to a user.

16. The system of claim 15, further including:
a user interface operable to provide the summarized execution activity to the user.

17. The system of claim 14, wherein the collected information includes infrequent samples of executing tasks.

18. The system of claim 14, wherein the collected information includes full traces of executing tasks.

19. The system of claim 14, wherein the step of inferring applies rule-based expert knowledge to infer the one or more execution states.

20. A computer readable storage medium, excluding signal per se, storing a program of instructions executable by a machine to perform a method of automatically identifying computer system performance bottlenecks using rule-based expert knowledge, comprising:
- collecting information associated with runtime execution of a computer system; and
- inferring one or more execution states of one or more tasks within the system based on the information,
- wherein the one or more execution states comprises one or more of runnable thread states and waiting thread states,
- wherein the inferring further comprises extracting one or more monitors, the monitors being programming objects that achieve synchronization in concurrent programming, the one or more extracted monitors providing information as to what threads are waiting on a critical section, and
- wherein the inferred one or more execution states provide information as to what a method on a stack associated with the runtime execution is doing.

21. The computer readable storage medium of claim 20, wherein the collected information includes infrequent samples of executing tasks.

22. The computer readable storage medium of claim 20, wherein the collected information includes full traces of executing tasks.

23. The computer readable storage medium of claim 20, wherein the step of inferring applies rule-based expert knowledge to infer the one or more execution states.

24. The computer readable storage medium of claim 20, wherein the rule-based expert knowledge maps names of tasks to an execution state.

25. The computer readable storage medium of claim 20, further including:
aggregating said one or more tasks by said one or more execution states for determining execution time, idle time, or system policy violations, or combinations thereof.

* * * * *